United States Patent
Wang et al.

(10) Patent No.: US 11,914,060 B2
(45) Date of Patent: Feb. 27, 2024

(54) POSITIONING METHOD, APPARATUS, AND DEVICE

(71) Applicant: HUAWEI TECHNOLOGIES CO., LTD., Guangdong (CN)

(72) Inventors: Yi Wang, Shanghai (CN); Jun Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 654 days.

(21) Appl. No.: 17/102,120

(22) Filed: Nov. 23, 2020

(65) Prior Publication Data
US 2021/0072340 A1    Mar. 11, 2021

Related U.S. Application Data

(63) Continuation of application No. PCT/CN2019/096018, filed on Jul. 15, 2019.

(30) Foreign Application Priority Data

Jul. 17, 2018    (CN) .......................... 201810785061.1

(51) Int. Cl.
G01S 5/02    (2010.01)
H04L 5/00    (2006.01)
H04W 72/0453    (2023.01)

(52) U.S. Cl.
CPC .......... *G01S 5/0221* (2013.01); *G01S 5/0215* (2013.01); *G01S 5/0268* (2013.01); *H04L 5/0048* (2013.01); *H04W 72/0453* (2013.01)

(58) Field of Classification Search
CPC .... G01S 5/0221; G01S 5/0215; G01S 5/0268; H04L 5/0048; H04W 72/0453
(Continued)

(56) References Cited

U.S. PATENT DOCUMENTS

2010/0273506 A1    10/2010    Stern-Berkowitz et al.
2017/0302312 A1    10/2017    Guan et al.
(Continued)

FOREIGN PATENT DOCUMENTS

CN    102711242 A    10/2012
CN    103634899 A    3/2014
(Continued)

OTHER PUBLICATIONS

Alcatel-Lucent, Alcatel-Lucent Shanghai Bell, "Text proposal on support of PRS and PRS-like signals operation on unlicensed band," 3GPP TSG RAN WG1 Meeting #81, R1-152673, Fukuoka, Japan, May 25-29, 2015, 3 pages.

Huawei, HiSilicon, "Text Proposal on updating Enhancements for OTDOA," 3GPP TSG RAN WG1 meeting #82, R1-154771, Beijing, China, Aug. 24-28, 2015, 5 pages.

3GPP TR 22.862 V14.1.0 (Sep. 2016), "3rd Generation Partnership Project; Technical Specification Group Services and System Aspects; Feasibility Study on New Services and Markets Technology Enablers for Critical Communications; Stage 1 (Release 14)," Sep. 2016, 31 pages.

(Continued)

*Primary Examiner* — Harry K Liu
(74) *Attorney, Agent, or Firm* — Fish & Richardson P.C.

(57) ABSTRACT

This application provides a positioning method, apparatus, and device. The method includes: receiving a first positioning reference signal PRS on a first frequency domain resource, where the first frequency domain resource is a frequency domain resource in an unlicensed spectrum; receiving a second PRS on a second frequency domain resource, where the second frequency domain resource is a frequency domain resource in a licensed spectrum; determining, based on the first PRS and the second PRS, a first positioning measurement result corresponding to the first PRS and a second positioning measurement result corresponding to the second PRS; and determining a location of a terminal based on the first positioning measurement result and the second positioning measurement result. The method may be applicable to quickly and accurately determining the location of the terminal without occupying a large quantity of frequency domain resources in the licensed spectrum.

20 Claims, 12 Drawing Sheets

(58) Field of Classification Search
USPC .......................................................... 342/451
See application file for complete search history.

(56) References Cited

U.S. PATENT DOCUMENTS

| | | | |
|---|---|---|---|
| 2017/0353278 A1 | 12/2017 | Patel et al. | |
| 2017/0374517 A1 | 12/2017 | Davydov et al. | |
| 2018/0007576 A1* | 1/2018 | Lee ....................... | H04W 24/10 |
| 2018/0020360 A1* | 1/2018 | Yerramalli ............. | H04B 1/713 |
| 2018/0027421 A1 | 1/2018 | Chrabieh | |
| 2019/0327706 A1* | 10/2019 | Agnihotri ............. | H04W 24/10 |

FOREIGN PATENT DOCUMENTS

| | | |
|---|---|---|
| CN | 104469931 A | 3/2015 |
| EP | 3282783 A1 | 2/2018 |
| WO | 2014029242 A1 | 2/2014 |
| WO | 2014066262 A1 | 5/2014 |

OTHER PUBLICATIONS

3GPP TS 36.211 V15.2.0 (Jun. 2018), "3rd Generation Partnership Project; Technical Specification Group Radio Access Network; Evolved Universal Terrestrial Radio Access (E-UTRA); Physical channels and modulation (Release 15)," Jun. 2018, 236 pages.
3GPP TR 38.913 V14.3.0 (2017-06), 3rd Generation Partnership Project; Technical Specification Group Radio Access Network; Study on Scenarios and Requirements for Next Generation Access Technologies;(Release 14), Jun. 2017, 39 pages.
Office Action issued in Chinese Application No. 201810785061.1 dated May 21, 2020, 19 pages (with English translation).
PCT International Search Report and Written Opinion issued in International Application No. PCT/CN2019/096018 dated Sep. 26, 2019, 11 pages (with English translation).
Extended European Search Report issued in European Application No. 19837737.6 dated Apr. 30, 2021, 14 pages.

* cited by examiner

POSITIONING METHOD, APPARATUS, AND DEVICE

CROSS-REFERENCE TO RELATED APPLICATIONS

This application is a continuation of International Application No. PCT/CN2019/096018, filed on Jul. 15, 2019, which claims priority to Chinese Patent Application No. 201810785061.1, filed on Jul. 17, 2018. The disclosures of the aforementioned applications are hereby incorporated by reference in their entireties.

TECHNICAL FIELD

This application relates to the field of wireless communications, and in particular, to a positioning method, apparatus, and device.

BACKGROUND

With the popularization of the mobile internet, a location service based on wireless positioning has experienced explosive growth in many fields such as navigation and automatic driving, traffic scheduling, internet of things, emergency rescue, device detection, disaster prevention, and personalized information services, and requires increasingly high positioning accuracy. For example, the 3rd generation partnership project (3GPP) organization proposes, in the technical report (TR) 22.862, that positioning accuracy of 5th generation (5G) mobile communication needs to be in a range of 30 centimeters to 1 meter.

According to used measurement parameters, an existing positioning method may include: a positioning method based on a time of arrival (TOA) of a positioning reference signal (PRS), a positioning method based on a time difference of arrival (TDOA) of the PRS, a positioning method based on an angle of arrival (AOA) of the PRS, and a joint positioning method based on at least two of the foregoing measurement parameters. Measurement accuracy of the TOA/TDOA-based positioning method depends on measurement accuracy of the time of arrival of the PRS, and the measurement accuracy of the time of arrival of the PRS is proportional to a bandwidth consecutively occupied by the PRS, to be specific, a wider bandwidth indicates higher accuracy. For example, if the positioning accuracy is 0.3 meters, the measurement accuracy of the TOA/TDOA-based positioning method is required to be less than or equal to 1 nanosecond (ns), to be specific, the bandwidth for transmitting the PRS is required to be at least 1 gigahertz (GHz). In addition, to reduce interference to the PRS, service data is usually not transmitted on a time-frequency resource occupied by the PRS. For example, although the AOA-based positioning method requires only a few frequency domain resources, to reduce the interference of the service data to the PRS, only the PRS is transmitted in a same slot or subframe occupied by the PRS, and no service data is transmitted. Consequently, a large quantity of time-frequency resources in the slot or subframe are idle.

However, a bandwidth of a licensed spectrum is eventually limited, and time domain resources are also limited. Therefore, if a relatively large quantity of time-frequency resources are reserved for high-accuracy positioning, a time-frequency resource required by the service data is inevitably occupied. Consequently, a system capacity and working efficiency of a communications system are reduced.

SUMMARY

This application provides a positioning method, apparatus, and device, so that the method is applicable to quickly and accurately determining a location of a terminal without occupying a large quantity of frequency domain resources in a licensed spectrum.

According to a first aspect, a positioning method is provided, including: receiving a first positioning reference signal PRS on a first frequency domain resource; receiving a second PRS on a second frequency domain resource, where the first frequency domain resource is a frequency domain resource in an unlicensed spectrum, and the second frequency domain resource is a frequency domain resource in a licensed spectrum; determining, based on the first PRS and the second PRS, a first positioning measurement result corresponding to the first PRS and a second positioning measurement result corresponding to the second PRS; and determining a location of a terminal based on the first positioning measurement result and the second positioning measurement result.

According to the positioning method provided in this application, the first PRS that is of a relatively large spectrum bandwidth and that is required for high-accuracy positioning can be received and measured by using the unlicensed spectrum, the second PRS can be received and measured by using an allocated frequency domain resource in the licensed spectrum, and the location of the terminal is determined based on the first positioning measurement result corresponding to the first PRS and the second positioning measurement result corresponding to the second PRS, so as to avoid occupying a large quantity of frequency domain resources in the licensed spectrum in a process of performing high-accuracy positioning on the terminal. In this way, the location of the terminal can be quickly and accurately determined without occupying a large quantity of frequency domain resources in the licensed spectrum, and more frequency domain resources in the licensed spectrum can be reserved for service data transmission, thereby improving resource utilization of the licensed spectrum, and improving a system capacity and working efficiency of a communications system.

In a possible design method, the first frequency domain resource may be the frequency domain resource of a first preset bandwidth in the unlicensed spectrum, and the first preset bandwidth is usually a relatively large bandwidth, to ensure measurement accuracy of the first PRS.

Correspondingly, the second frequency domain resource may be the frequency domain resource of a second preset bandwidth in the licensed spectrum, and the second preset bandwidth is usually a relatively small bandwidth, to reserve a relatively large quantity of frequency domain resources in the licensed spectrum for the service data transmission, thereby improving the resource utilization of the licensed spectrum and improving the system capacity and the working efficiency of the communications system.

For example, the first preset bandwidth may be an overall bandwidth of the unlicensed spectrum, to further improve the measurement accuracy of the first PRS. Correspondingly, the second preset bandwidth may be a part of a bandwidth of the licensed spectrum, to reduce the frequency domain resources that are in the licensed spectrum and that are occupied for the high-accuracy positioning, so as to reserve more resources for the service data transmission, thereby improving frequency domain resource utilization in the licensed spectrum, and improving the system capacity and the working efficiency of the communications system.

In a possible design method, the first frequency domain resource is the frequency domain resource that is in the unlicensed spectrum and that corresponds to a preset time window; the preset time window includes a first preset quantity of time units, and the time unit is one of the following: a symbol and a slot.

Optionally, the first preset quantity of time units may be one time unit, for example, one symbol, so as to centrally transmit the first PRS and simplify time-frequency resource allocation.

Optionally, the first preset quantity of time units may alternatively be at least two time units, and a time diversity gain of first PRSs transmitted in different time units may be used to further improve the measurement accuracy of the first PRS. Alternatively, a plurality of candidate time units may be set for transmitting the first PRS, to improve a probability of successfully transmitting the first PRS, thereby improving reliability of measuring the first PRS. It may be further determined, in a manner of listen before talk (LBT), that there is no other signal, for example, signaling and/or data of another radio system, on the unlicensed spectrum, so as to avoid interference caused by another signal to the first PRS transmitted on the unlicensed spectrum, thereby further improving measurement accuracy of the first PRS and the second PRS.

It may be understood that the at least two time units may be inconsecutive, partially consecutive, or all consecutive. Provided that it is ensured that the at least two time units are in a same preset time window, a time correlation between different time units may be used to further improve the measurement accuracy of the first PRS.

In a possible design method, the second frequency domain resource may alternatively be the frequency domain resource that is in the licensed spectrum and that corresponds to the preset time window. That is, both the second frequency domain resource and the first frequency domain resource are frequency domain resources corresponding to the preset time window. It may be considered that there is a strong time correlation between the first PRS and the second PRS, and the positioning accuracy can be further improved.

Optionally, the preset time window is in a preset periodicity, the preset periodicity includes a second preset quantity of the consecutive time units, and the second preset quantity is greater than the first preset quantity. It may be understood that a purpose of setting the preset periodicity is to periodically transmit the first PRS and the second PRS, so as to refresh the location of the terminal in time.

In a possible design method, the first positioning measurement result includes a time of arrival TOA of the first PRS; the second positioning measurement result includes an angle of arrival AOA of the second PRS. Correspondingly, the determining a location of a terminal based on the first positioning measurement result and the second positioning measurement result may include: determining the location of the terminal based on the TOA and the AOA; to be specific, determining, based on the TOA of the first PRS, a radius of a circumference centered on a base station, determining based on the AOA that the second PRS takes to arrive at the base station or the terminal. In addition, the location of the terminal may be determined based on one AOA and one circumference centered on the base station, and a calculation process of circumferences centered on a plurality of base stations is not involved, so that a calculation amount of determining the location of the terminal can be simplified, thereby improving positioning efficiency.

In another possible design method, a measurement result of the first PRS includes a time difference of arrival TDOA, and the TDOA is a difference value between times of arrival TOAs that the first PRS sent by the terminal takes to arrive at different network devices, or a difference value between times of arrival TOAs that first PRSs sent by different network devices take to arrive at the terminal; and a measurement result of the second PRS is an angle of arrival AOA of the second PRS. Correspondingly, the determining a location of a terminal based on the first positioning measurement result and the second positioning measurement result includes: determining the location of the terminal based on the TDOA and the AOA; and determining, the location of the terminal based on AOAs that the second PRS takes to arrive at the two base stations and/or the terminal. In other words, a hyperbola focusing on the two base stations can be determined only based on TDOAs that the first PRS takes to arrive at and/or leave the two base stations, and a case in which the location of the terminal can be determined only by using at least three hyperbolas focusing on at least two pairs of combinations of at least three base stations is not involved, so that the calculation amount of positioning the location of the terminal can be reduced, thereby improving the positioning efficiency.

According to a second aspect, a positioning apparatus is provided. The apparatus includes a receiving module and a determining module. The receiving module is configured to: receive a first positioning reference signal PRS on a first frequency domain resource; and receive a second PRS on a second frequency domain resource. The first frequency domain resource is a frequency domain resource in an unlicensed spectrum, and the second frequency domain resource is a frequency domain resource in a licensed spectrum. The determining module is configured to: determine, based on the first PRS and the second PRS, a first positioning measurement result corresponding to the first PRS and a second positioning measurement result corresponding to the second PRS, and determine a location of a terminal based on the first positioning measurement result and the second positioning measurement result.

According to the positioning apparatus provided in this application, the first PRS that is of a relatively large spectrum bandwidth and that is required for high-accuracy positioning can be received and measured by using the unlicensed spectrum, the second PRS can be received and measured by using an allocated frequency domain resource in the licensed spectrum, and the location of the terminal is determined based on the first positioning measurement result corresponding to the first PRS and the second positioning measurement result corresponding to the second PRS, so as to avoid occupying a large quantity of frequency domain resources in the licensed spectrum in a process of performing high-accuracy positioning on the terminal. In this way, the location of the terminal can be quickly and accurately determined without occupying a large quantity of frequency domain resources in the licensed spectrum, and more frequency domain resources in the licensed spectrum can be reserved for service data transmission, thereby improving resource utilization of the licensed spectrum, and improving a system capacity and working efficiency of a communications system.

In a possible design, the first frequency domain resource may be the frequency domain resource of a first preset bandwidth in the unlicensed spectrum, and the first preset bandwidth is a relatively large bandwidth, to ensure measurement accuracy of the first PRS. Correspondingly, the second frequency domain resource may be the frequency domain resource of a second preset bandwidth in the licensed spectrum, and the second preset bandwidth is a relatively small bandwidth, to reserve a relatively large quantity of frequency domain resources in the licensed spectrum for service data transmission, thereby improving the resource utilization of the licensed spectrum and improving the system capacity and the working efficiency of the communications system.

Further, the first preset bandwidth may be an overall bandwidth of the unlicensed spectrum, to further improve the measurement accuracy of the first PRS. Correspondingly, the second preset bandwidth may be a part of a bandwidth of the licensed spectrum, to reduce the frequency domain resources that are in the licensed spectrum and that are occupied for the high-accuracy positioning, so as to reserve more resources for the service data transmission, thereby improving frequency domain resource utilization in the licensed spectrum, and improving the system capacity and the working efficiency of the communications system.

In a possible design, the first frequency domain resource is the frequency domain resource that is in the unlicensed spectrum and that corresponds to a preset time window; the preset time window includes a first preset quantity of time units, and the time unit is one of the following: a symbol and a slot.

Optionally, the first preset quantity of time units may be one time unit, for example, one symbol, so as to centrally transmit the first PRS and simplify time-frequency resource allocation.

Optionally, the first preset quantity of time units may alternatively be at least two time units, and a time diversity gain of first PRSs transmitted in different time units may be used to further improve the measurement accuracy of the first PRS. Alternatively, a plurality of candidate time units may be set for transmitting the first PRS, to improve a probability of successfully transmitting the first PRS, thereby improving reliability of measuring the first PRS. It may be further determined, in a manner of LBT, that there is no other signal, for example, signaling and/or data of another radio system, on the unlicensed spectrum, so as to avoid interference caused by another signal to the first PRS transmitted on the unlicensed spectrum, thereby further improving measurement accuracy of the first PRS and the second PRS.

It may be understood that the at least two time units may be inconsecutive, partially consecutive, or all consecutive. Provided that it is ensured that the at least two time units are in a same preset time window, a time correlation between different time units may be used to further improve the measurement accuracy of the first PRS.

In a possible design, the second frequency domain resource may alternatively be the frequency domain resource that is in the licensed spectrum and that corresponds to the preset time window. That is, both the second frequency domain resource and the first frequency domain resource are frequency domain resources corresponding to the preset time window. It may be considered that there is a strong time correlation between the first PRS and the second PRS, and the positioning accuracy may be further improved.

Optionally, the preset time window is in a preset periodicity, the preset periodicity includes a second preset quantity of the consecutive time units, and the second preset quantity is greater than the first preset quantity. It may be understood that a purpose of setting the preset periodicity is to periodically transmit the first PRS and the second PRS, so as to refresh the location of the terminal in time.

In a possible design, a measurement result of the first PRS includes a time difference of arrival TDOA, and the TDOA is a difference value between times of arrival TOAs that the first PRS sent by the terminal takes to arrive at different network devices, or a difference value between times of arrival TOAs that first PRSs sent by different network devices take to arrive at the terminal; and a measurement result of the second PRS is an angle of arrival AOA of the second PRS. Correspondingly, the determining module is further configured to determine the location of the terminal based on the TDOA and the AOA.

For example, the apparatus may be a terminal or a base station, or may be a network device that has a signal connection to the terminal and/or the base station and that is configured to perform the positioning method provided in the first aspect, for example, a location management function (LMF) device, or may be a software system installed on the terminal, the base station, or an LMF service center. This is not limited in this application.

According to a third aspect, a positioning device is provided. The positioning device includes a processor and a memory coupled to the processor. The memory is configured to store a computer program. The processor is configured to execute the computer program stored in the memory, so that the positioning device performs the method according to any one of the first aspect and various optional implementations of the first aspect.

In a possible design, the positioning device includes one or more processors and a communications unit. The one or more processors are configured to support the apparatus in executing a corresponding function of the positioning device in the foregoing method. For example, a TDOA, a TOA, an AOA, and a location of a terminal are determined. The communications unit is configured to support the device in communicating with another device, to implement a receiving function and/or a sending function, for example, receiving or sending a first PRS, or receiving or sending a second PRS.

Optionally, the positioning device may further include one or more memories, the memory is configured to be coupled to the processor, and the memory stores a program instruction and/or data that are/is necessary for the positioning device. The one or more memories may be integrated with the processor, or may be disposed independent of the processor. This is not limited in this application.

For example, the positioning device may be a network device, for example, a gNB in a new radio (NR) system or an evolved NodeB (eNB) in a long term evolution (LTE) system, or may be a terminal, for example, a mobile phone or a tablet computer, or may be an LMF service center. The communications unit may be a transceiver or a transceiver circuit. Optionally, the transceiver may alternatively be an input/output (I/O) circuit or interface.

The positioning device may alternatively be a communications chip. The communications unit may be an input/output circuit or interface of the communications chip.

In another possible design, the positioning device includes a transceiver, a processor, and a memory. The processor is configured to control the transceiver to send and receive a signal. The memory is configured to store a computer program. The processor is configured to run the computer program stored in the memory, so that the positioning device performs the positioning method performed by the positioning device according to any one of the first aspect and the possible implementations of the first aspect.

According to a fourth aspect, a positioning system is provided. The system includes the foregoing terminal, network device, and positioning device that can perform the positioning method according to any one of the first aspect and various optional implementations of the first aspect. The positioning device may be any one of the terminal, the network device, and an LMF service center connected to the terminal and/or the network device.

According to a fifth aspect, a computer-readable storage medium is provided, and is configured to store a computer program. The computer program includes an instruction for performing the method according to any one of the first aspect or the possible implementations of the first aspect.

According to a sixth aspect, a computer program product is provided. The computer program product includes computer program code. When the computer program code is run on a computer, the computer is enabled to perform the method according to any one of the first aspect or the possible implementations of the first aspect.

According to the method provided in the embodiments of this application, a power and/or power headroom determining method applicable to a multi-beam scenario may be provided, and is applicable to power control or power headroom reporting in the multi-beam scenario, for example, applicable to power control or power headroom reporting in an NR system.

DESCRIPTION OF EMBODIMENTS

Figure 1:
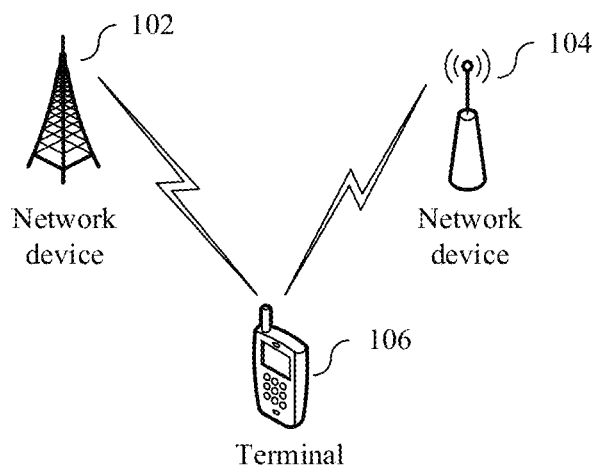
FIG. 1 is a schematic architectural diagram 1 of a communications system to which a positioning method according to an embodiment of this application is applicable.

The following describes technical solutions in this application with reference to the accompanying drawings.

The technical solutions in the embodiments of this application may be applied to various communications systems, for example, an LTE system, a worldwide interoperability for microwave access (WiMAX) communications system, a 5th generation (5G) system, an NR system, and a future communications system, for example, a 6th generation (6G) system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of the solutions may further be used.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner.

In the embodiments of this application, "information", "signal", "message", "channel", "signaling", and "message" may be interchangeably used sometimes. It should be noted that meanings expressed by the terms are consistent when differences are not emphasized. The terms "of", "corresponding (relevant)", and "corresponding" may be interchangeably used sometimes. It should be noted that meanings expressed by the terms are consistent when differences of the terms are not emphasized.

In the embodiments of this application, sometimes a subscript in, for example, $W_1$ may be written in an incorrect form such as W1. Expressed meanings are consistent when differences are not emphasized.

The network architecture and the service scenario described in the embodiments of this application are intended to describe the technical solutions in the embodiments of this application more clearly, but constitute no limitation on the technical solutions provided in the embodiments of this application. A person of ordinary skill in the art may learn that, with the evolution of the network architecture and the emergence of new service scenarios, the technical solutions provided in the embodiments of this application are also applicable to similar technical problems.

The embodiments of this application may be applied to a time division duplexing (TDD) scenario, or may be applied to a frequency division duplexing (FDD) scenario.

The embodiments of this application may be applied to a conventional typical network, or may be applied to a future UE-centric network. A non-cell network architecture is introduced to the UE-centric network. To be specific, a large quantity of small cells are deployed in a specific area to form a hyper cell, and each small cell is a transmission point (TP) or a transmission and reception point ( ) of the hyper cell, and is connected to a centralized controller (controller). When UE moves in the hyper cell, a network side device selects, for the UE in real time, a new sub-cluster to serve the UE, thereby avoiding a real cell handover, and implementing service continuity of the UE. The network side device includes a communications system device, for example, a base station.

In the embodiments of this application, an NR network scenario in a wireless communications network is used to describe some scenarios. It should be noted that the solutions in the embodiments of this application may be further applied to another wireless communications network, and a corresponding name may also be replaced with a name of a corresponding function in another wireless communications network.

For ease of understanding the embodiments of this application, a communications system shown in FIG. 1 is first used as an example to describe in detail a communications system applicable to the embodiments of this application. FIG. 1 is a schematic diagram of a communications system to which a communication method according to an embodiment of this application is applicable. As shown in FIG. 1, the communications system includes a network device 102, a network device 104, and a terminal 106. A location of the terminal 106 may be determined by measuring a positioning reference signal (PRS) transmitted between the terminal 106 and at least one of the network device 102 and the network device 104.

It should be understood that the network device 102 or the network device 104 may further include a plurality of components (for example, a processor, a modulator, a multiplexer, a demodulator, or a demultiplexer) related to signal sending and receiving.

The network device is a device that has a wireless transceiver function or a chip that can be disposed in the device. The device includes but is not limited to an eNB, a radio network controller (RNC), a NodeB (NB), a base station controller (BSC), a base transceiver station (BTS), a home evolved NodeB (for example, a home evolved NodeB, or a home Node B, HNB), a baseband unit (BBU), an access point (AP) in a wireless fidelity (WIFI) system, a wireless relay node, a wireless backhaul node, a transmission point, and the like. The device may alternatively be a gNB, or a transmission point (TP), or a TRP in a 5G such as an NR system.

The terminal may also be referred to as user equipment (UE), an access terminal, a subscriber unit, a subscriber station, a mobile station, a mobile console, a remote station, a remote terminal, a mobile device, a user terminal, a terminal device, a wireless communications device, a user agent, or a user apparatus. The terminal in the embodiments of this application may be a mobile phone, a tablet (Pad), a computer that has a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, the foregoing terminal and the chip that can be disposed in the foregoing terminal are collectively referred to as a terminal.

In the communications system, both the network device 102 and the network device 104 may communicate with a plurality of terminals (for example, the terminal 106 shown in the figure). The network device 102 and the network device 104 may communicate with any quantity of terminals similar to the terminal 106. However, it should be understood that the terminal that communicates with the network device 102 and the terminal that communicates with the network device 104 may be the same, or may be different. The terminal 106 shown in FIG. 1 may communicate with both the network device 102 and the network device 104, but this shows only a possible scenario. In some scenarios, the terminal may communicate with only the network device 102 or the network device 104. This is not limited in this application.

It should be understood that FIG. 1 is merely a simplified schematic diagram used as an example for ease of understanding. The communications system may further include another network device or another terminal, which is not drawn in FIG. 1.

In a communications network, one node may send a signal to at least one other node. Certainly, one node may also receive a signal sent by at least one other node. The node herein may be a base station, user equipment, or the like. For example, the terminal 106 in FIG. 1 may send PRSs to the network device 102 and the network device 104. The terminal 106 in FIG. 1 may also receive the positioning reference signals sent by the network device 102 and the network device 104.

It should be noted that the PRSs may be transmitted (including sending and receiving) on a licensed spectrum, or may be transmitted on an unlicensed spectrum, or transmitted on both a licensed spectrum and an unlicensed spectrum.

Figure 2:
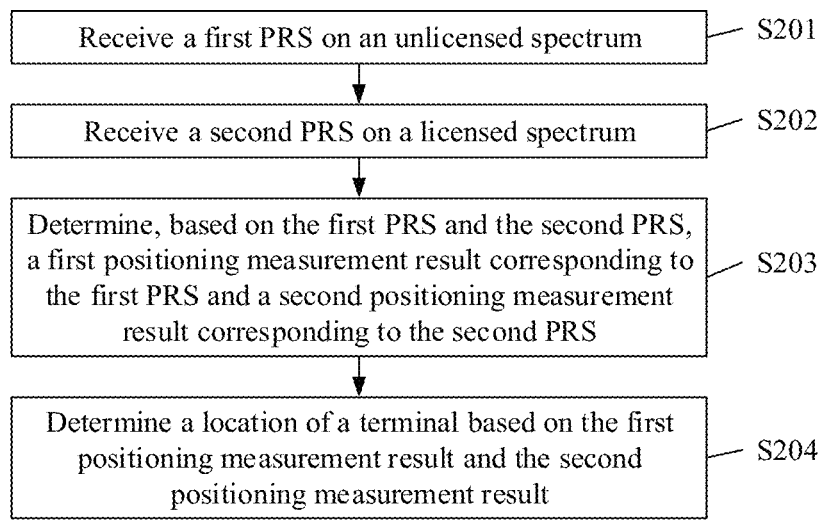
FIG. 2 is a schematic flowchart 1 of a positioning method according to an embodiment of this application.

As shown in FIG. 2, an embodiment of this application provides a positioning method. The method is applicable to positioning the terminal 106 in the communications system shown in FIG. 1. In this application, uplink may mean that a terminal is a transmit end, and a network device is a receive end; and downlink may mean that a network device is a transmit end, and a terminal is a receive end. When this application is applied to communication between the transmit end and the receive end, the uplink may be a transmission direction, and the downlink may be another transmission direction opposite to the uplink.

As shown in FIG. 2, the positioning method includes S201 to S204:

S201: Receive a first positioning reference signal PRS on a first frequency domain resource.

The first frequency domain resource is a frequency domain resource in an unlicensed spectrum.

In a possible design method, the first frequency domain resource may be the frequency domain resource of a first preset bandwidth in the unlicensed spectrum. The first preset bandwidth is usually a relatively large bandwidth, to ensure measurement accuracy of the first PRS.

For example, the first preset bandwidth is an overall bandwidth of the unlicensed spectrum, to further improve the measurement accuracy of the first PRS.

In a possible design method, the first frequency domain resource is the frequency domain resource that is in the unlicensed spectrum and that corresponds to a preset time window. The preset time window includes a first preset quantity of time units, and the time unit is one of the following: a symbol and a slot. The first preset quantity may be greater than or equal to 1.

Optionally, the first preset quantity of time units may be one time unit, so as to centrally transmit the first PRS. For example, all subcarriers in one time unit may be used to transmit the first PRS. Because the time unit is no longer used to transmit data or another control signal, whether the subcarriers allocated to the first PRS collide with a subcarrier used to transmit data or another control signal does not need to be considered, thereby reducing operation complexity of allocating a time-frequency resource to the first PRS.

Figure 3A:
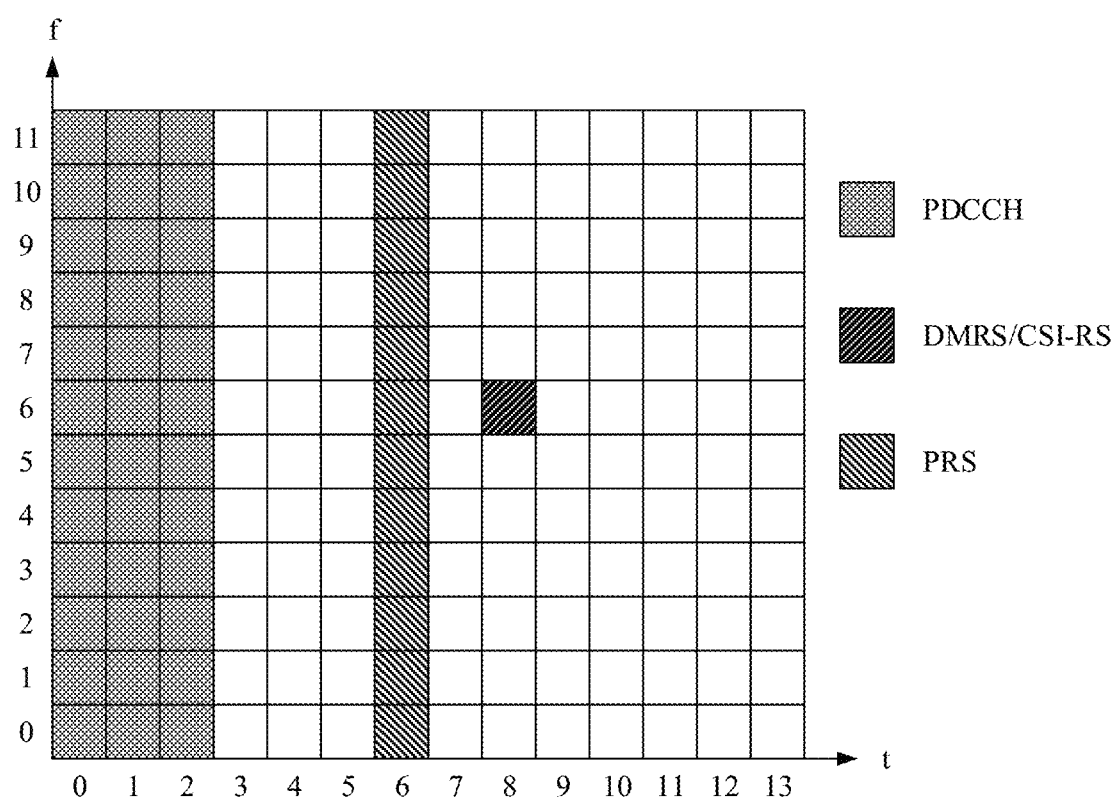
FIG. 3A is a schematic diagram 1 of allocating a frequency domain resource in an unlicensed spectrum to a first PRS in a positioning method according to an embodiment of this application.
Figure 3B:
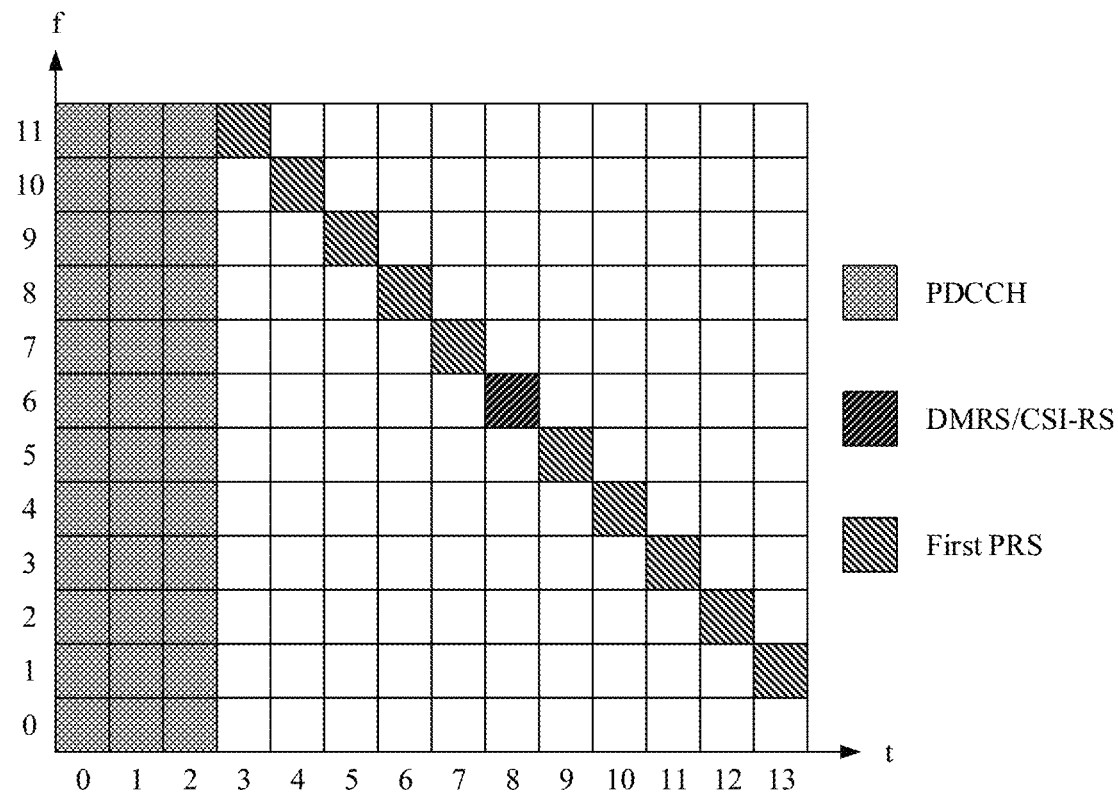
FIG. 3B is a schematic diagram 2 of allocating a frequency domain resource in an unlicensed spectrum to a first PRS in a positioning method according to an embodiment of this application.

For example, the time unit is a slot. FIG. 3A and FIG. 3B each are a schematic diagram of transmitting a first PRS in a slot.

As shown in FIG. 3A, the first PRS is transmitted on an overall bandwidth of an unlicensed spectrum of a symbol 6 in the slot. Certainly, in addition to the symbol 6, the first PRS may alternatively be transmitted on an overall bandwidth of an unlicensed spectrum of another symbol in the slot. This is not limited in this embodiment of this application.

To prevent interference between adjacent subcarriers on a same symbol from adversely affecting receiving of the first PRS, the first PRS may alternatively be transmitted on a plurality of symbols in the slot. For example, as shown in FIG. 3B, one subcarrier may be allocated to each of a symbol 3 to the symbol 6 and a symbol 9 to a symbol 13 in the slot, to transmit the first PRS.

It should be noted that FIG. 3A and FIG. 3B merely show allocation of frequency domain resources on one resource block (RB), to be specific, 12 subcarriers, on the unlicensed spectrum. A person skilled in the art should understand that, based on FIG. 3A or FIG. 3B, an allocation solution of the frequency domain resources on an overall bandwidth of the unlicensed spectrum can be obtained by extending to all subcarriers included in the unlicensed spectrum in a frequency domain direction.

Optionally, the first preset quantity of time units may alternatively be at least two time units, so that a time diversity gain of first PRSs transmitted in different time units is used to further improve the measurement accuracy of the first PRS. For example, demodulation and channel decoding are performed after the first PRSs received in the at least two time units are combined, to obtain a more accurate measurement result.

Optionally, a plurality of candidate time units may further be set for transmitting the first PRS, so as to transmit the first PRS on an overall bandwidth that is of an unlicensed spectrum and that corresponds to any one of the plurality of candidate time units, thereby increasing a probability of successfully transmitting the first PRS, and improving reliability of measuring the first PRS.

Figure 3C:
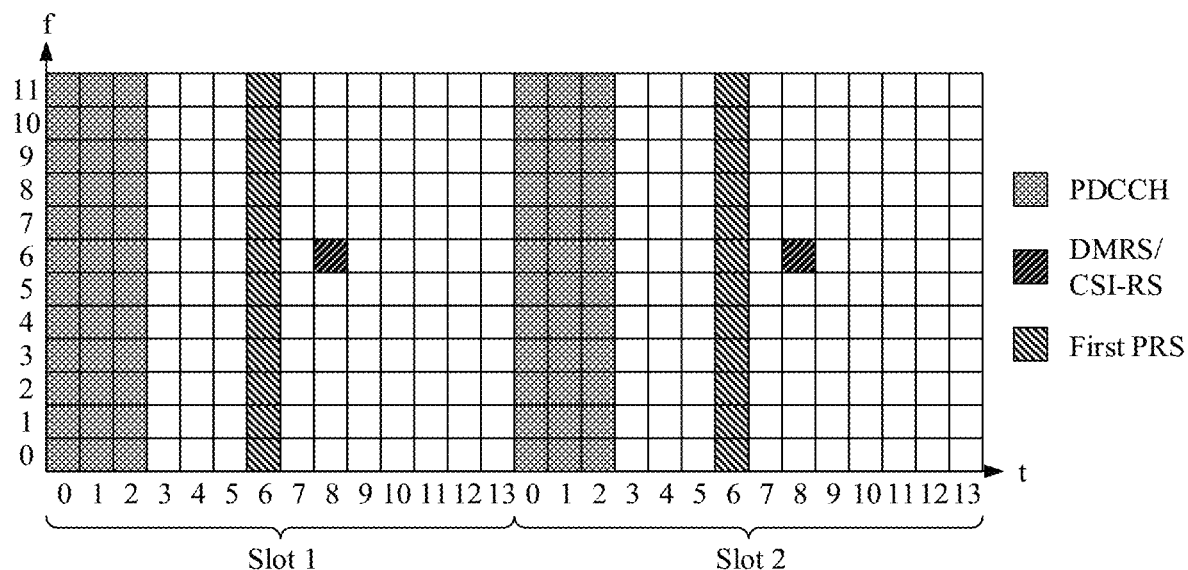
FIG. 3C is a schematic diagram 3 of allocating a frequency domain resource in an unlicensed spectrum to a first PRS in a positioning method according to an embodiment of this application.
Figures 3D, 3E:
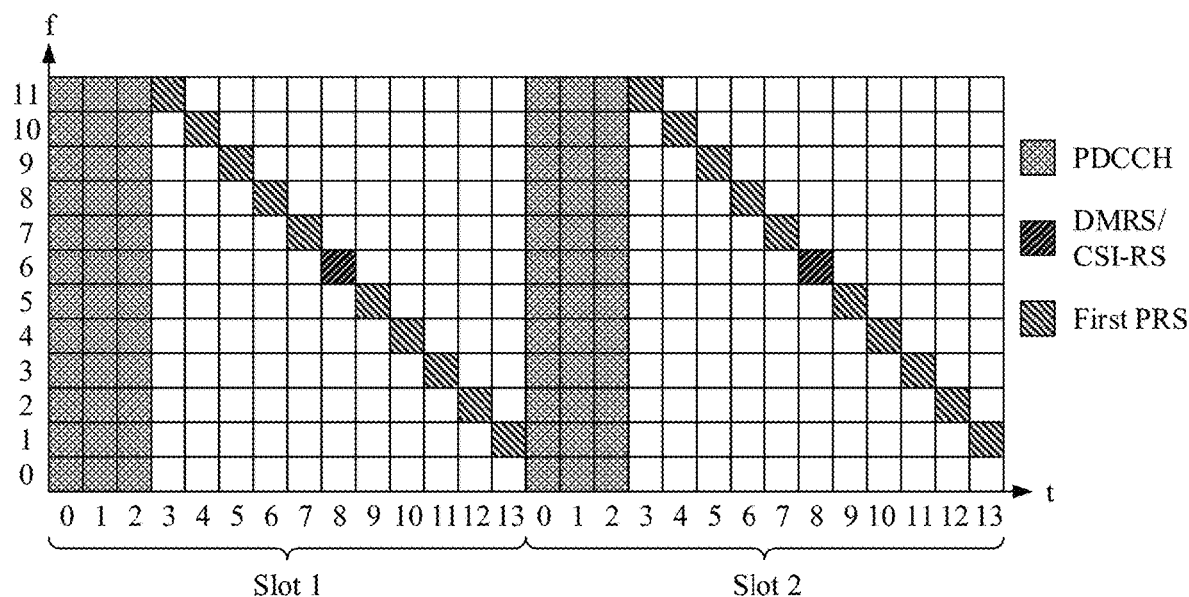
FIG. 3D is a schematic diagram 4 of allocating a frequency domain resource in an unlicensed spectrum to a first PRS in a positioning method according to an embodiment of this application.
FIG. 3E is a schematic diagram of a transmission pattern of a first PRS in a positioning method according to an embodiment of this application.

For example, as shown in FIG. 3E, the first preset quantity of time units include the following four candidate slots: slots 1 to 4. Therefore, any one or more of the slots 1 to 4 may be selected to transmit the first PRS. For example, if the first PRS is selected to be transmitted in the slot 1, the first PRS may not need to be transmitted in the slots 2 to 4. If the first PRS is not selected to be transmitted in the slot 1, the first PRS may be transmitted in the slot 2. It may be understood that, when a slot immediately before another slot is not selected to transmit the first PRS, another slot may be selected to transmit the first PRS. Details are not described in the foregoing embodiment.

It may be understood that when there are a plurality of candidate time units, a receiver may not know which time units are used to transmit the first PRS. Therefore, to ensure that the receiver reliably receives the first PRS, in each of the plurality of candidate time units, the receiver needs to perform blind detection on the first PRS. Certainly, if the receiver learns that a sender sends the first PRS in only one of the plurality of time units, after successfully receiving the first PRS in a time unit, the receiver may immediately stop receiving the first PRS in a candidate time unit that exists after the time unit, to reduce a workload of receiving the first PRS, thereby reducing power consumption. For example, as shown in FIG. 3E, if the receiver has learned that the sender sends the first PRS only in one of the slots 1 to 4, and the receiver has received the first PRS in the slot 1, the receiver immediately stops receiving the first PRS, to be specific, does not receive the first PRS in the slots 2 to 4.

Optionally, the first PRS may be transmitted on the unlicensed spectrum only when it is determined, in a manner of LBT, that there is no other signal, for example, signaling and/or data of another radio system, on the unlicensed spectrum, so as to reduce a probability that the first PRS is interfered by the another signal transmitted on the unlicensed spectrum, thereby further improving measurement accuracy of the first PRS and a second PRS.

It should be noted that a frequency domain resource that is of an unlicensed spectrum and that corresponds to each of the at least two time units may be obtained by extending the frequency domain resource shown in FIG. 3A or FIG. 3B in a time domain direction. For example, as shown in FIG. 3C, the first PRS is transmitted on frequency domain resources that are of an overall bandwidth of the unlicensed spectrum and that respectively correspond to a symbol 6 in the slot 1 and a symbol 6 in the slot 2. For another example, as shown in FIG. 3D, one subcarrier used to transmit the first PRS is allocated to a symbol 3 to the symbol 6 and a symbol 9 to a symbol 13 in the slot 2 and a symbol 3 to a symbol 6 and a symbol 9 to a symbol 13 in the slot 3.

It may be understood that the at least two time units may be inconsecutive, partially consecutive, or all consecutive. Provided that it is ensured that the at least two time units are in a same preset time window, a time correlation between different time units can be used to reduce adverse impact of a time-varying characteristic of a radio channel on the measurement result, thereby further improving the measurement accuracy of the first PRS. For example, an example in which the at least two time units are three slots is used for description. For example, the preset time window includes the slot 1 to a slot 5, and the at least two time units include the slot 1, the slot 3, and the slot 5. In other words, all time units are not consecutive to each other. For another example, the preset time window includes the slot 1 to the slot 4, and the at least two time units include the slot 1, the slot 2, and the slot 4, or include the slot 1, the slot 3, and the slot 4. In other words, only some time units are consecutive. For still another example, the preset time window includes the slot 1 to the slot 3, and the at least two time units also include the slot 1 to the slot 3. In other words the time units are all consecutive.

It should be noted that, in addition to the first PRS, other signals such as service data, a demodulation reference signal (DMRS), a channel state information reference signal (CSI-RS), a physical downlink control channel (PDCCH), and a physical uplink control channel (PUCCH) may be further transmitted on the unlicensed spectrum. Because a priority of a positioning service is usually relatively low, when a time-frequency resource is allocated to the first PRS, a time-frequency resource allocated to user data and/or a control signal needs to be avoided. For example, as shown in FIG. 3A, if the PDCCH is transmitted on a symbol 0 to the symbol 2 in the slot, the first PRS is not transmitted on the symbol 0 to the symbol 2 in the slot, to avoid the PDCCH. Similarly, if the DMRS/CSI-RS is transmitted on a subcarrier 6 of a symbol 8 in the slot, the first PRS is not transmitted on the subcarrier 6 of the symbol 8, to avoid the DMRS/CSI-RS.

Optionally, the preset time window is in a preset periodicity, the preset periodicity includes a second preset quantity of the consecutive time units, and the second preset quantity is greater than the first preset quantity. It may be understood that a purpose of setting the preset periodicity is to periodically transmit the first PRS, so that a first positioning measurement result can be updated in time, and then a location of a terminal is refreshed in time.

For example, as shown in FIG. 3E, a time unit is a slot, the preset periodicity is a radio frame, and the preset time window is the slot 1 to the slot 4. In other words, an offset between a start time unit of the preset periodicity and the preset time window is one slot. In actual application, the preset periodicity may be flexibly configured by a network device, for example, a base station, or an LMT. Each preset periodicity may include only one preset time window, or may include a plurality of preset time windows. This is not limited in this embodiment of this application.

Because the preset time window shown in FIG. 3E includes four slots, there is a transmission opportunity in each slot, to be specific, the first PRS has a plurality of transmission opportunities. When it is determined, in the manner of LBT, that there is an idle channel on an unlicensed spectrum corresponding to the slot, one or more idle slots in the preset time window are selected to transmit the first PRS, so as to reduce a probability that the first PRS is interfered, thereby improving the measurement accuracy of the first PRS.

Specifically, as shown in FIG. 3E, a radio frame n is used as an example, the first PRS may be sent by using the following steps:

Step 1: Perform LBT in a slot 0 of the radio frame n, to determine whether there is an idle channel on the unlicensed spectrum. For example, if a signal strength received on a frequency domain resource in an unlicensed spectrum corresponding to the slot 0 is less than a strength threshold, it is considered that there is an idle channel on the unlicensed spectrum.

Step 2: Determine, based on an execution result of step 1, whether to send the first PRS on the frequency domain resource that is in the unlicensed spectrum and that corresponds to the preset time window of the radio frame n, and how to send the first PRS. Specifically, step 2 may be performed in any one of the following manners:

Manner 1: If there is an idle channel on the unlicensed spectrum corresponding to the slot 0 of the radio frame n, the first PRS is sent in each of the slot 1 to the slot 4 of the radio frame n.

Manner 2: If there is an idle channel on the unlicensed spectrum corresponding to the slot 0 of the radio frame n, the first PRS is sent in the slot 1 of the radio frame n, and the first PRS is not sent in the slot 2 to the slot 4.

Manner 3: If there is no idle channel on the unlicensed spectrum corresponding to the slot 0 of the radio frame n, step 1 continues to be performed in the slot 1 of the radio frame n, and then step 2 is performed again based on a result of step 1 performed in the slot 1 of the radio frame n.

Manner 4: If there is no idle channel on the unlicensed spectrum corresponding to the slot 0 of the radio frame n, the first PRS is not sent in the slot 1 to the slot 4 of the radio frame n, but step 1 continues to be performed in the slot 0 of a radio frame n+1, then, the manner 4 in step 2 is performed again based on an execution result of step 1 in the slot 0 of the radio frame n+1, and the manners 1 to 3 in step 2 may be performed until an idle channel is detected through monitoring.

In actual application, step 2 may be always performed in one of the foregoing four manners, or step 2 may be performed in a combination of the foregoing four manners. This is not limited in this embodiment of this application. For example, the manner 1 in step 2 may be performed in the radio frame n, and the manner 2 in step 2 may be performed in the radio frame n+1.

It should be noted that the preset periodicity is synchronized with the radio frame, and the offset may alternatively be 0, or may be a plurality of slots. This is not limited in this embodiment of this application. Certainly, the preset periodicity may not be 10 slots, for example, may further be 20, 80, or 160 slots. This is not limited in this embodiment of this application.

It may be understood that when the time unit is a symbol, the preset periodicity may be set to one slot, and the preset time window may be set to at least one symbol. If the preset time window includes at least two symbols, for each of the at least two symbols, the first PRS may alternatively be sent in the foregoing manner of LBT. Details are not described again in this embodiment of this application.

It should be noted that the first PRS may be transmitted in a downlink direction, to be specific, the network device is a sender, and the terminal is a receiver; or the first PRS may be transmitted in an uplink direction, to be specific, the terminal is a sender, and the network device is a receiver. This is not limited in this embodiment of this application. It may be understood that, in this embodiment of this application, the first PRS should be measured by a receiver.

S202: Receive a second PRS on a second frequency domain resource.

The second frequency domain resource is a frequency domain resource in a licensed spectrum.

The second frequency domain resource may be the frequency domain resource of a second preset bandwidth in the licensed spectrum, and the second preset bandwidth is usually a relatively small bandwidth, to reserve a relatively large quantity of frequency domain resources in the licensed spectrum for service data transmission, thereby improving resource utilization of the licensed spectrum and improving a system capacity and working efficiency of a communications system. For example, the second preset bandwidth may be a part of a bandwidth of the licensed spectrum.

Figure 3F:
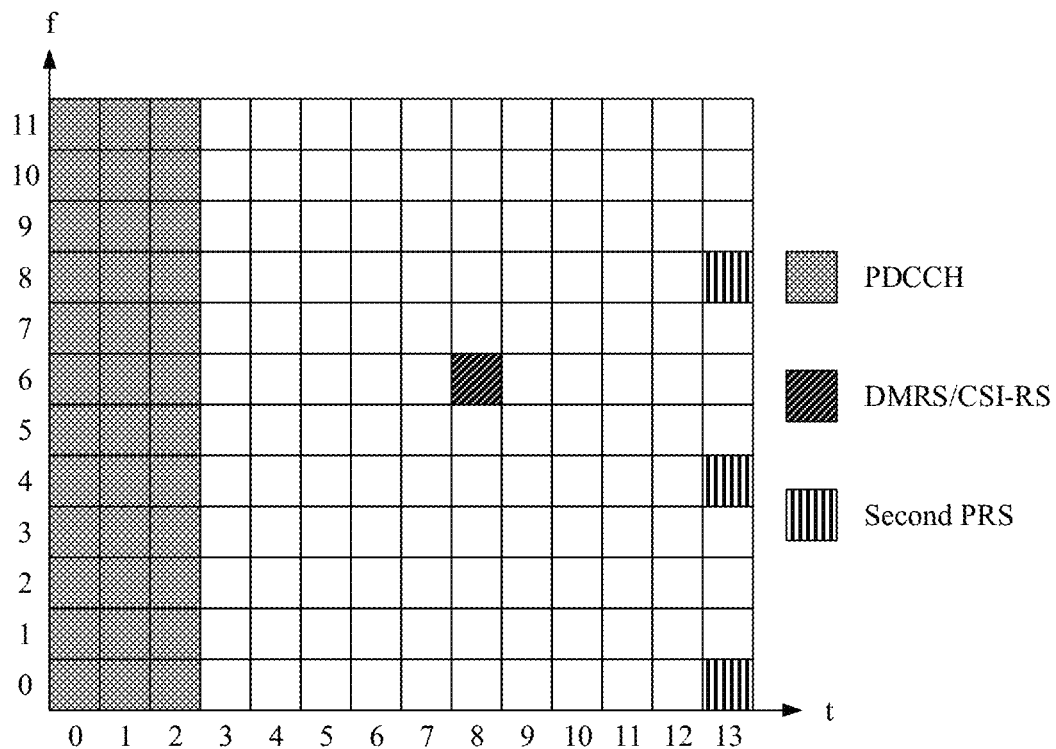
FIG. 3F is a schematic diagram of allocating a frequency domain resource in a licensed spectrum to a second PRS in a positioning method according to an embodiment of this application.

For example, FIG. 3F shows an example of transmitting a second PRS on a frequency domain resource in a licensed spectrum corresponding to a slot. As shown in FIG. 3F, the second PRS may be transmitted on subcarriers 0, 4, and 8 in the licensed spectrum corresponding to the last symbol (the symbol 13) in the slot. Certainly, the second PRS may alternatively be transmitted on another subcarrier in the licensed spectrum corresponding to the last symbol, or may be transmitted on some subcarriers in a licensed spectrum corresponding to another symbol in the slot. This is not limited in this embodiment of this application.

It may be understood that when transmission times of the second PRS and the first PRS are the same or relatively close, there is a strong time correlation between the second PRS and the first PRS, so that positioning accuracy of the terminal can be improved. Therefore, further, the second PRS and the first PRS may be transmitted in a same time unit or adjacent time units. For example, as shown in FIG. 3E, the second PRS is transmitted in the last slot of the four slots. Certainly, the second PRS may alternatively be transmitted in another one or more of the four slots. This is not limited in this embodiment of this application.

In a possible design method, the second frequency domain resource may alternatively be the frequency domain resource that is in the licensed spectrum and that corresponds to the preset time window. That is, both the second frequency domain resource and the first frequency domain resource are frequency domain resources corresponding to a same preset time window. It may be considered that there is a strong time correlation between the first PRS and the second PRS, and the positioning accuracy can be further improved.

Optionally, similar to the first PRS, the second PRS may alternatively be transmitted in a periodic manner, so as to update a second positioning measurement result in time and complete refreshing the location of the terminal.

Similar to the first PRS, the second PRS may be transmitted in the downlink direction, to be specific, the network device is a sender, and the terminal is a receiver; or the second PRS may be transmitted in the uplink direction, to be specific, the terminal is a sender, and the network device is a receiver. This is not limited in this embodiment of this application.

In addition, a transmission direction of the second PRS may be the same as or different from a transmission direction of the first PRS. This is not limited in this embodiment of this application. For example, both the first PRS and the second PRS are transmitted in the downlink direction. For another example, the first PRS is transmitted in the downlink direction, and the second PRS is transmitted in the uplink direction.

It should be noted that a sequence of performing S202 and S201 does not need to be limited in this embodiment of this application. For example, S201 may be first performed, and then S202 is performed; or S202 may be first performed, and then S201 is performed; or S202 may be performed in a process of performing S201.

S203: Determine, based on the first PRS and the second PRS, the first positioning measurement result corresponding to the first PRS and the second positioning measurement result corresponding to the second PRS.

The first PRS and the second PRS are measured by respective receivers.

For example, if the first PRS is transmitted in the uplink direction, the first PRS is measured by the network device; or if the first PRS is transmitted in the downlink direction, the first PRS is measured by the terminal. Similarly, a measurement entity of the second PRS may be determined. Details are not described again in this embodiment of this application.

S204: Determine the location of the terminal based on the first positioning measurement result and the second positioning measurement result.

Optionally, the first positioning measurement result may include a time of arrival TOA of the first PRS; the second positioning measurement result may include an angle of arrival AOA of the second PRS. Correspondingly, S204 of determining the location of the terminal based on the first positioning measurement result and the second positioning measurement result may include the following step:

Determine the location of the terminal based on the TOA and the AOA, to be specific, determine the location of the terminal by using a joint TOA+AOA positioning method.

Figure 4A:
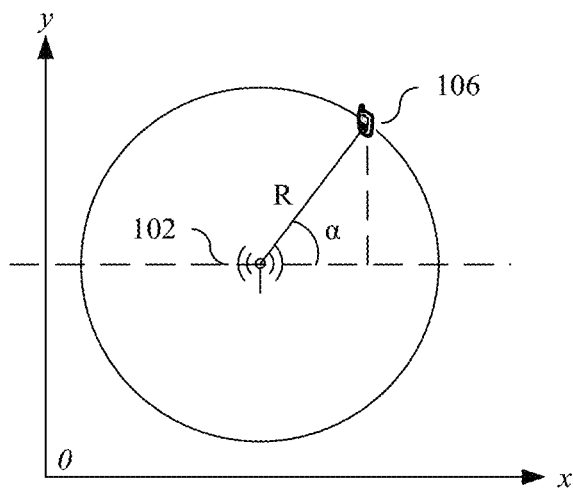
FIG. 4A is a schematic diagram of a scenario of a joint TOA+AOA positioning method according to an embodiment of this application.

For example, FIG. 4A is a schematic diagram of a scenario of determining a location of a terminal. As shown in FIG. 4A, based on a sending time and a time of arrival of the first PRS, a propagation time (arrival time point-sending time point) of the first PRS between the terminal and the network device may be calculated, so that a distance R (a product of the propagation time and a propagation velocity of an electromagnetic wave) between the terminal and the network device may be determined, a circle whose center is a location of the network device and whose radius is R may be further determined, and the terminal is located on a circumference of the circle. The location of the network device may be longitude and latitude of the network device, or coordinate values in a coordinate system in which the network device is located. This is not limited in this embodiment of this application. Then, the second positioning measurement result may be determined based on the received second PRS, to be specific, the AOA of the second PRS is $\alpha$.

A rectangular coordinate system is used as an example. Assuming that rectangular coordinates of the terminal are $(x,y)$, an equation set including the following two formulas may be obtained based on rectangular coordinates $(z_0, y_0)$ of the network device, R, and $\alpha$, and the foregoing equation set may be solved to determine the rectangular coordinates $(x,y)$ of the terminal:

$$(x - x_0)^2 + (y - y_0)^2 = R^2, \text{ and}$$

$$\arctan(\alpha) = \frac{y - y_0}{x - x_0}.$$

It should be noted that, in the example shown in FIG. 4A, $\alpha$ is defined by using an included angle between a propagation path of the second PRS and a forward direction of the x-axis, and a value range is $0 \leq \alpha < 2\pi$. Certainly, $\alpha$ may further be defined in another manner. For example, $\alpha$ is defined as an included angle between the propagation path of the second PRS and a forward direction of the y-axis. This is not limited in this embodiment of this application.

Optionally, the measurement result of the first PRS may include a time difference of arrival TDOA, and the TDOA is a difference value between times of arrival TOAs that the first PRS sent by the terminal takes to arrive at different network devices, or a difference value between times of arrival TOAs that first PRSs sent by different network devices take to arrive at the terminal; and the measurement result of the second PRS is the angle of arrival AOA of the second PRS. Correspondingly, S204 of determining the location of the terminal based on the first positioning measurement result and the second positioning measurement result may include the following step:

Determine the location of the terminal based on the TDOA and the AOA.

Figure 4B:
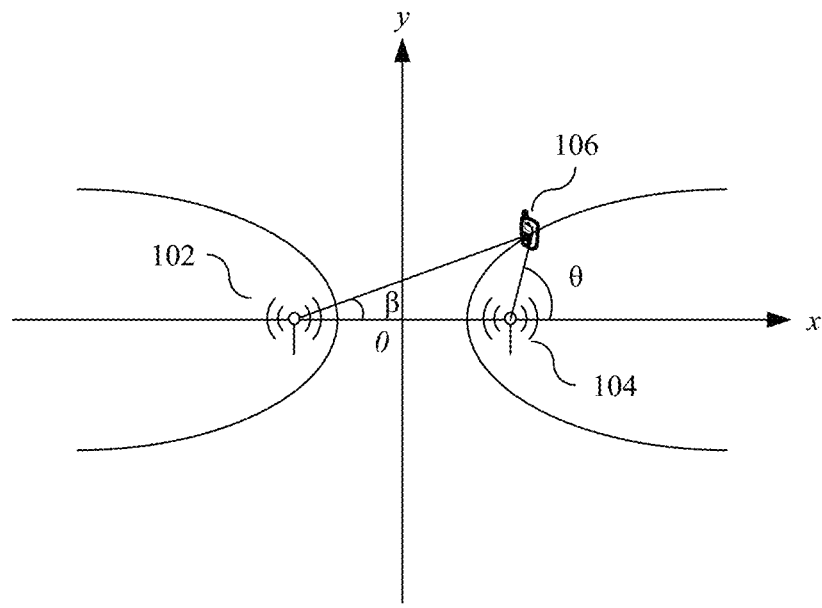
FIG. 4B is a schematic diagram of a scenario of a joint TDOA+AOA positioning method according to an embodiment of this application.

FIG. 4B is a schematic diagram of another scenario of determining a location of a terminal. As shown in FIG. 4B, a first PRS and a second PRS are transmitted between a terminal 106 and each of a network device 102 and a network device 104. It is assumed that rectangular coordinates of the network device 102 are $(-c,0)$, rectangular coordinates of the network device 104 are $(c,0)$, and a TDOA of the first PRS and two AOAs (that is, $\beta$ and $\theta$ in FIG. 4B) of the second PRS may be obtained through measurement, rectangular coordinates of the terminal are (x,y), and may be obtained by solving an equation set including the following formulas:

$$\frac{x^2}{a^2} - \frac{y^2}{b^2} = 1,$$

$$a^2 + b^2 = c^2,$$

$$2*a = TDOA*V,$$

$$\arctan(\beta) = \frac{y}{x+c}, \text{ and}$$

$$\arctan(\theta) = \frac{y}{x-c},$$

where

V is a propagation velocity of an electromagnetic wave, that is, the speed of light. It should be noted that in the example shown in FIG. 4B, β and θ may be defined in a same manner as a, or may be defined in different manners. This is not limited in this embodiment of this application.

It should be noted that a transmission direction of the second PRS may be the same as or different from that of the first PRS. In addition, S204 in the positioning method provided in this embodiment of this application may be performed by the network device, or may be performed by the terminal, or may be performed by a third-party execution body, for example, an LMF service center, that has a signal connection to the network device and/or the terminal. Because the LMF service center belongs to the prior art, details are not described in this embodiment of this application.

For example, Table 1 to Table 3 show summary information of several scenarios to which the positioning method provided in this embodiment of this application is applicable.

TABLE 1

| Scenario | Transmission direction of a first PRS | Transmission direction of a second PRS | Execution body of S204 | Remark |
|---|---|---|---|---|
| 1 | Downlink | Downlink | Network device | The network device performs S204 based on a first positioning measurement result and a second positioning measurement result that are reported by a terminal |
| 2 | Downlink | Downlink | Terminal | The terminal directly performs S204 based on the first positioning measurement result and the second positioning measurement result |
| 3 | Downlink | Downlink | LMF service center | Sub-scenario 1: The LMF service center is connected to the terminal: The LMF service center performs S204 based on the first positioning measurement result and the second positioning measurement result that are sent by the terminal Sub-scenario 2: The LMF service center is connected to the network device, and is not connected to the terminal: (1) The network device receives the first positioning measurement result and the second positioning measurement result that are reported by the terminal, and forwards the first positioning measurement result and the second positioning measurement result to the LMF service center; and (2) The LMF service center performs S204 based on the first positioning measurement result and the second positioning measurement result that are forwarded by the network device |

TABLE 2

| Scenario | Transmission direction of a first PRS | Transmission direction of a second PRS | Execution body of S204 | Remark |
| --- | --- | --- | --- | --- |
| 4 | Downlink | Uplink | Network device | (1) The network device receives a first positioning measurement result reported by a terminal; and (2) The network device performs S204 based on a second positioning measurement result and the first positioning measurement result that is reported by the terminal |
| 5 | Downlink | Uplink | Terminal | (1) The terminal receives the second positioning measurement result delivered by the network device; and (2) The terminal performs S204 based on the first positioning measurement result and the second positioning measurement result that is delivered by the network device |
| 6 | Downlink | Uplink | LMF service center | Sub-scenario 1: The LMF service center is connected to the terminal, and is not connected to the network device: (1) The terminal receives the second positioning measurement result delivered by the network device, and forwards the second positioning measurement result to the LMF service center; and (2) The LMF service center performs S204 based on the first positioning measurement result sent by the terminal and the second positioning measurement result forwarded by the terminal Sub-scenario 2: The LMF service center is connected to the network device, and is not connected to the terminal: (1) The network device receives the first positioning measurement result reported by the terminal, and forwards the first positioning measurement result to the LMF service center; and (2) The LMF service center performs S204 based on the first positioning measurement result forwarded by the network device and the second positioning measurement result sent by the network device Sub-scenario 3: The LMF service center is connected to both the network device and the terminal: |

TABLE 2-continued

| Scenario | Transmission direction of a first PRS | Transmission direction of a second PRS | Execution body of S204 | Remark |
|---|---|---|---|---|
| 7 | Uplink | Uplink | Network device | The LMF service center performs S204 based on the first positioning measurement result sent by the terminal and the second positioning measurement result sent by the network device The network device directly performs S204 based on the first positioning measurement result and the second positioning measurement result |
| 8 | Uplink | Uplink | Terminal | The terminal performs S204 based on the first positioning measurement result and the second positioning measurement result that are delivered by the network device |

TABLE 3

| Scenario | Transmission direction of a first PRS | Transmission direction of a second PRS | Execution body of S204 | Remark |
|---|---|---|---|---|
| 9 | Uplink | Uplink | LMF service center | Sub-scenario 1: The LMF service center is connected to a terminal, and is not connected to a network device: (1) The terminal receives a first positioning measurement result and a second positioning measurement result that are delivered by the network device, and forwards the first positioning measurement result and the second positioning measurement result to the LMF service center; and (2) The LMF service center performs S204 based on the first positioning measurement result and the second positioning measurement result that are forwarded by the terminal Sub-scenario 2: The LMF service center is connected to the network device: The LMF service center performs S204 based on the first positioning measurement result and the second positioning measurement result that are sent by the network device |
| 10 | Uplink | Downlink | Network device | (1) The network device receives the second positioning measurement result reported by the terminal; and (2) The network device |

TABLE 3-continued

| Scenario | Transmission direction of a first PRS | Transmission direction of a second PRS | Execution body of S204 | Remark |
|---|---|---|---|---|
| | | | | performs S204 based on the first positioning measurement result and the second positioning measurement result that is reported by the terminal |
| 11 | Uplink | Downlink | Terminal | (1) The terminal receives the first positioning measurement result delivered by the network device; and<br>(2) The terminal performs S204 based on the first positioning measurement result and the second positioning measurement result that are delivered by the network device |
| 12 | Uplink | Downlink | LMF service center | Sub-scenario 1: The LMF service center is connected to a terminal, and is not connected to a network device:<br>(1) The terminal receives the first positioning measurement result delivered by the network device, and forwards the first positioning measurement result to the LMF service center; and<br>(2) The LMF service center performs S204 based on the first positioning measurement result forwarded by the terminal and the second positioning measurement result sent by the terminal<br>Sub-scenario 2: The LMF service center is connected to the network device, and is not connected to the terminal:<br>(1) The network device receives the second positioning measurement result reported by the terminal, and forwards the second positioning measurement result to the LMF service center; and<br>(2) The LMF service center performs S204 based on the first positioning measurement result sent by the network device and the second positioning measurement result forwarded by the network device<br>Sub-scenario 3: The LMF service center is connected to both the network device and the terminal: The LMF service center performs S204 based on the first positioning measurement result sent by the network device and the second positioning measurement result sent by the terminal |

Figure 5:
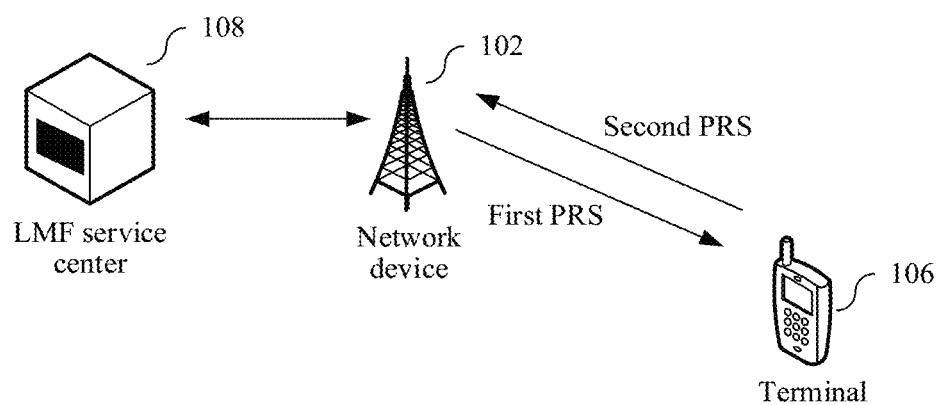
FIG. 5 is a schematic architectural diagram 2 of a communications system to which a positioning method according to an embodiment of this application is applicable.

FIG. 5 is a schematic architectural diagram of another communications network to which a positioning method according to an embodiment of this application is applicable. As shown in FIG. 5, a first PRS is transmitted on an unlicensed spectrum of downlink between a network device 102 and a terminal 106, a second PRS is transmitted on a licensed spectrum of uplink between the network device 102 and the terminal 106, and there is a wired or wireless connection between the network device 102 and an LMF service center 108. Certainly, S204 in the foregoing method embodiment may be performed by the network device 102, or may be performed by the terminal 106, or may be performed by the LMF service center. This is not limited in this embodiment of this application.

FIG. 6A to FIG. 6D are schematic flowcharts of a positioning method in the scenario 2 shown in Table 1, the sub-scenarios 2 in the scenario 7 and the scenario 6 shown in Table 2, and the sub-scenario 2 in the scenario 12 shown in Table 3 according to an embodiment of this application.

Figure 6A:
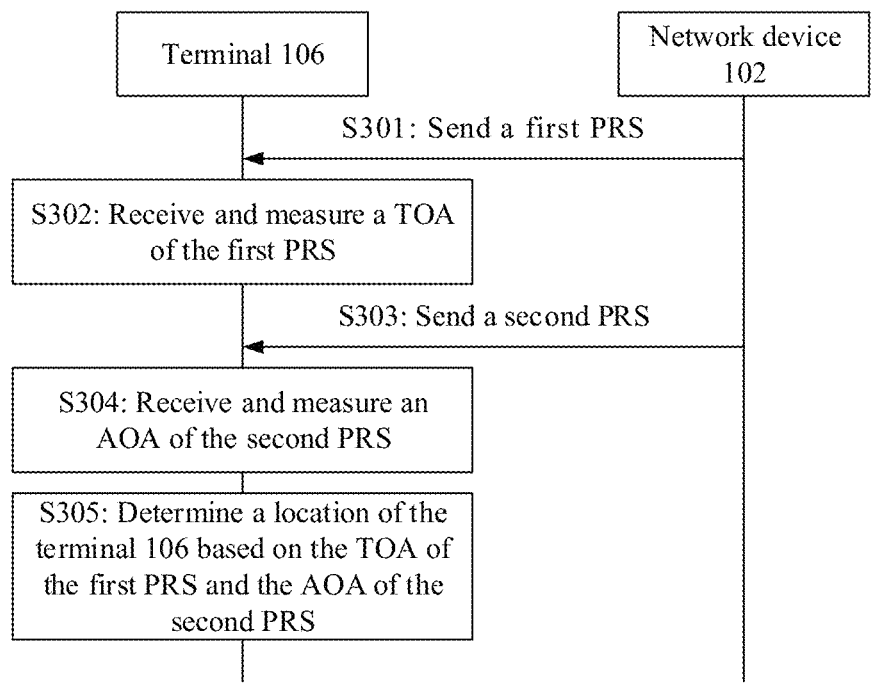
FIG. 6A is a schematic flowchart 2 of a positioning method according to an embodiment of this application.

For example, as shown in FIG. 6A, based on the scenario 2, the method shown in FIG. 2 may be specifically implemented as S301 to S305:

S301: A network device 102 sends a first PRS to a terminal 106.

S302: The terminal 106 receives and measures a TOA of the first PRS.

For example, the network device 102 sends, on an unlicensed spectrum, the first PRS to the terminal 106. Correspondingly, the terminal 106 also receives and measures, on the unlicensed spectrum, the TOA of the first PRS sent by the network device 102.

Specifically, referring to the method shown in FIG. 3A to FIG. 3D, a frequency domain resource in the unlicensed spectrum is allocated to the first PRS. Details are not described herein again.

S303: The network device 102 sends a second PRS to the terminal 106.

S304: The terminal 106 receives and measures an AOA of the second PRS.

Specifically, referring to the method shown in FIG. 3E and FIG. 3F, a frequency domain resource in a licensed spectrum is allocated to the second PRS. Details are not described herein again.

The AOA of the second PRS is an angle of arrival that the second PRS takes to arrive at the network device 102 after the second PRS is sent by the terminal 106. Because the AOA belongs to the prior art, details are not described in this embodiment of this application.

It should be noted that a sequence of performing S301 and S302 and S303 and S304 does not need to be limited in this embodiment of this application, provided that S301 and S302 and S303 and S304 are all performed before S305 is performed.

Optionally, S301 and S302 may be performed before S303 and S304 are performed, or may be performed after S303 and S304 are performed, or may be performed simultaneously with S303 and S304. For example, the network device 102 may simultaneously send, on a same symbol, the first PRS and the second PRS to the terminal 106. Correspondingly, the terminal 106 also simultaneously receives and measures, on the symbol, the TOA of the first PRS and the AOA of the second PRS.

S305: The terminal 106 determines a location of the terminal 106 based on the TOA of the first PRS and the AOA of the second PRS.

For example, the terminal 106 may determine the location of the terminal 106 by using the joint TOA+AOA positioning method shown in FIG. 4A.

Figure 6B:
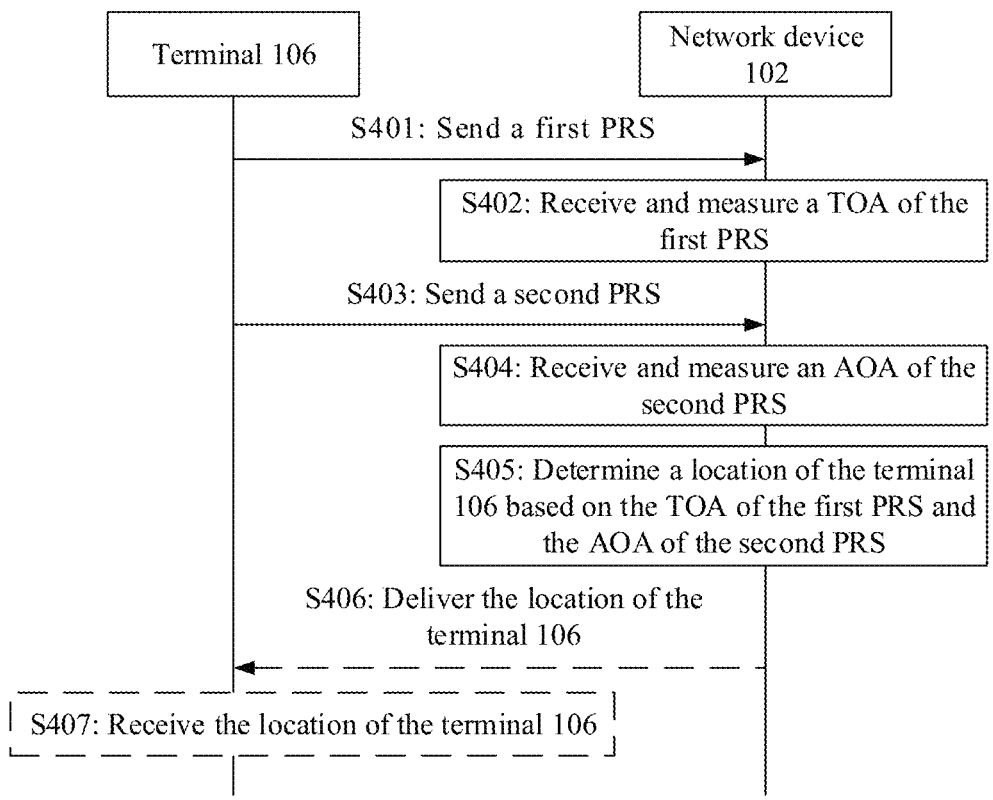
FIG. 6B is a schematic flowchart 3 of a positioning method according to an embodiment of this application.

For example, as shown in FIG. 6B, based on the scenario 7, the method shown in FIG. 2 may be further specifically implemented as S401 to S405:

S401: The terminal 106 sends the first PRS to the network device 102.

S402: The network device 102 receives and measures the TOA of the first PRS.

For example, the terminal 106 sends, on the unlicensed spectrum, the first PRS to the network device 102. Correspondingly, the network device 102 receives and measures, on the unlicensed spectrum, the TOA of the first PRS sent by the terminal 106.

Specifically, referring to the method shown in FIG. 3A to FIG. 3D, a frequency domain resource in the unlicensed spectrum is allocated to the first PRS. Details are not described herein again.

S403: The terminal 106 sends the second PRS to the network device 102.

S404: The network device 102 receives and measures the AOA of the second PRS.

Specifically, referring to the method shown in FIG. 3E and FIG. 3F, a frequency domain resource in a licensed spectrum is allocated to the second PRS. Details are not described herein again.

The AOA of the second PRS is an angle of arrival that the second PRS takes to arrive at the network device 102 after the second PRS is sent by the terminal 106. Because the AOA belongs to the prior art, details are not described in this embodiment of this application.

It should be noted that a sequence of performing S401 and S402 and S403 and S404 does not need to be limited in this embodiment of this application, provided that S401 and S402 and S403 and S404 are all performed before S405 is performed.

Optionally, S401 and S402 may be performed before S403 and S404 are performed, or may be performed after S403 and S404 are performed, or may be performed simultaneously with S403 and S404. For example, the terminal 106 may simultaneously send, on a same symbol, the first PRS and the second PRS to the network device 102. Correspondingly, the network device 102 also simultaneously receives and measures, on the symbol, the TOA of the first PRS and the AOA of the second PRS.

S405: The network device 102 determines the location of the terminal 106 based on the TOA of the first PRS and the AOA of the second PRS.

For example, the network device 102 may determine the location of the terminal 106 by using the joint TOA+AOA positioning method shown in FIG. 4A.

Then, if the terminal 106 needs to learn of location information of the terminal 106, for example, the terminal 106 is running an application such as a map, navigation, or self-driving, the method may further include S406 and S407 (represented by dashed lines in FIG. 6B):

S406: The network device 102 delivers the location of the terminal 106 to the terminal 106.

S407: The terminal 106 receives the location that is of the terminal 106 and that is delivered by the network device 102.

For example, the location of the terminal 106 may be transmitted in a manner similar to S301 and S302 and S303 and S304. Details are not described herein again.

Figure 6C:
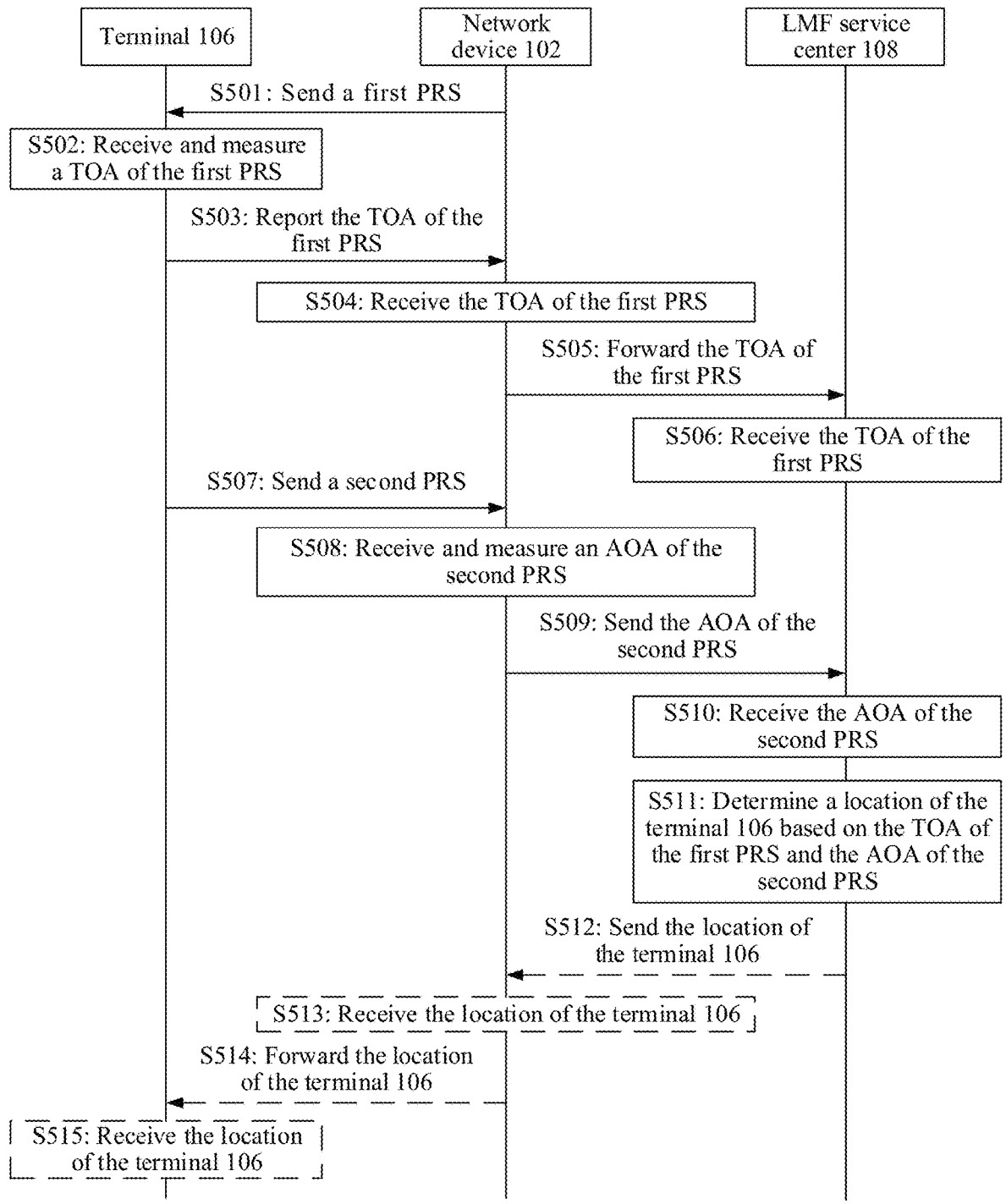
FIG. 6C is a schematic flowchart 4 of a positioning method according to an embodiment of this application.

For example, as shown in FIG. 6C, based on the sub-scenario 2 in the scenario 6, the method shown in FIG. 2 may be further specifically implemented as S501 to S511:

S501: The network device 102 sends the first PRS to the terminal 106.

S502: The terminal 106 receives and measures the TOA of the first PRS.

It should be noted that execution methods of S501 and S502 are similar to those of S301 and S302. Details are not described herein again.

Because S204 in the foregoing method embodiment is performed by an LMF service center 108 connected to the network device 102, the terminal 106 further needs to report the TOA of the first PRS to the network device 102, and the network device 102 forwards the TOA to the LMF service center 108. Therefore, after S501 and S502 are performed, S503 to S506 further need to be performed:

S503: The terminal 106 reports the TOA of the first PRS to the network device 102.

S504: The network device 102 receives the TOA that is of the first PRS and that is reported by the terminal 106.

For example, the terminal 106 may report the TOA of the first PRS in a form of uplink signaling such as a measurement report (MR) or a location update report. Details are not described in this embodiment of this application.

S505: The network device 102 forwards the TOA of the first PRS to the LMF service center 108.

S506: The LMF service center 108 receives the TOA that is of the first PRS and that is forwarded by the network device 102.

Specifically, the network device 102 may send the TOA of the first PRS to the LMF service center 108 by using a wired or wireless connection between the network device 102 and the LMF service center 108. Correspondingly, the LMF service center 108 may receive the TOA of the first PRS by using a wired or wireless connection between the LMF service center 108 and the network device 102.

S507: The terminal 106 sends the second PRS to the network device 102.

S508: The network device 102 receives and measures the AOA of the second PRS.

Execution methods of S507 and S508 are similar to those of S403 and S404. Details are not described again in this embodiment of this application.

Because S204 in the foregoing method embodiment is performed by the LMF service center 108 connected to the network device 102, the network device 102 further needs to send the AOA of the second PRS to the LMF service center 108. Therefore, after S507 and S508 are performed, S509 and S510 further need to be performed:

S509: The network device 102 sends the AOA of the second PRS to the LMF service center 108.

S510: The LMF service center 108 receives the AOA that is of the second PRS and that is sent by the network device 102.

Execution methods of S509 and S510 are similar to those of S505 and S506. Details are not described herein again.

It should be noted that a sequence of performing S501 to S506 and S507 to S510 does not need to be limited in this embodiment of this application, provided that S501 to S506 and S507 to S510 are all performed before S511 is performed. Optionally, S501 to S506 may be performed before S507 to S510 are performed, or may be performed after S507 to S510 are performed. Optionally, S501 to S506 may be performed in a process of performing S507 to S510, and S507 to S510 may also be performed in a process of performing S501 to S506. Optionally, some of the steps in S501 to S506 may also be simultaneously performed with the steps in S507 to S510. For example, S505 and S506 and S509 and S510 may be combined for execution, to be specific, the network device 102 simultaneously sends the TOA of the first PRS and the AOA of the second PRS to the LMF service center.

S511: The LMF service center 108 determines the location of the terminal 106 based on the received TOA of the first PRS and the received AOA of the second PRS.

For example, the LMF service center 108 may determine the location of the terminal 106 by using the joint TOA+AOA positioning method shown in FIG. 4A.

Then, if the terminal 106 needs to learn of location information of the terminal 106, for example, the terminal 106 is running an application such as a map, navigation, or self-driving, the method may further include S512 to S515 (represented by dashed lines in FIG. 6C):

S512: The LMF service center 108 sends the location of the terminal 106 to the network device 102.

S513: The network device 102 receives the location that is of the terminal 106 and that is sent by the LMF service center 108.

For example, the location of the terminal 106 may be transmitted by using a wired or wireless connection between the LMF service center 108 and the network device 102. Details are not described herein.

S514: The network device 102 forwards the location of the terminal 106 to the terminal 106.

S515: The terminal 106 receives the location that is of the terminal 106 and that is forwarded by the network device 102.

For example, the location of the terminal 106 may be transmitted in a manner similar to S406 and S407. Details are not described herein again.

Figure 6D:
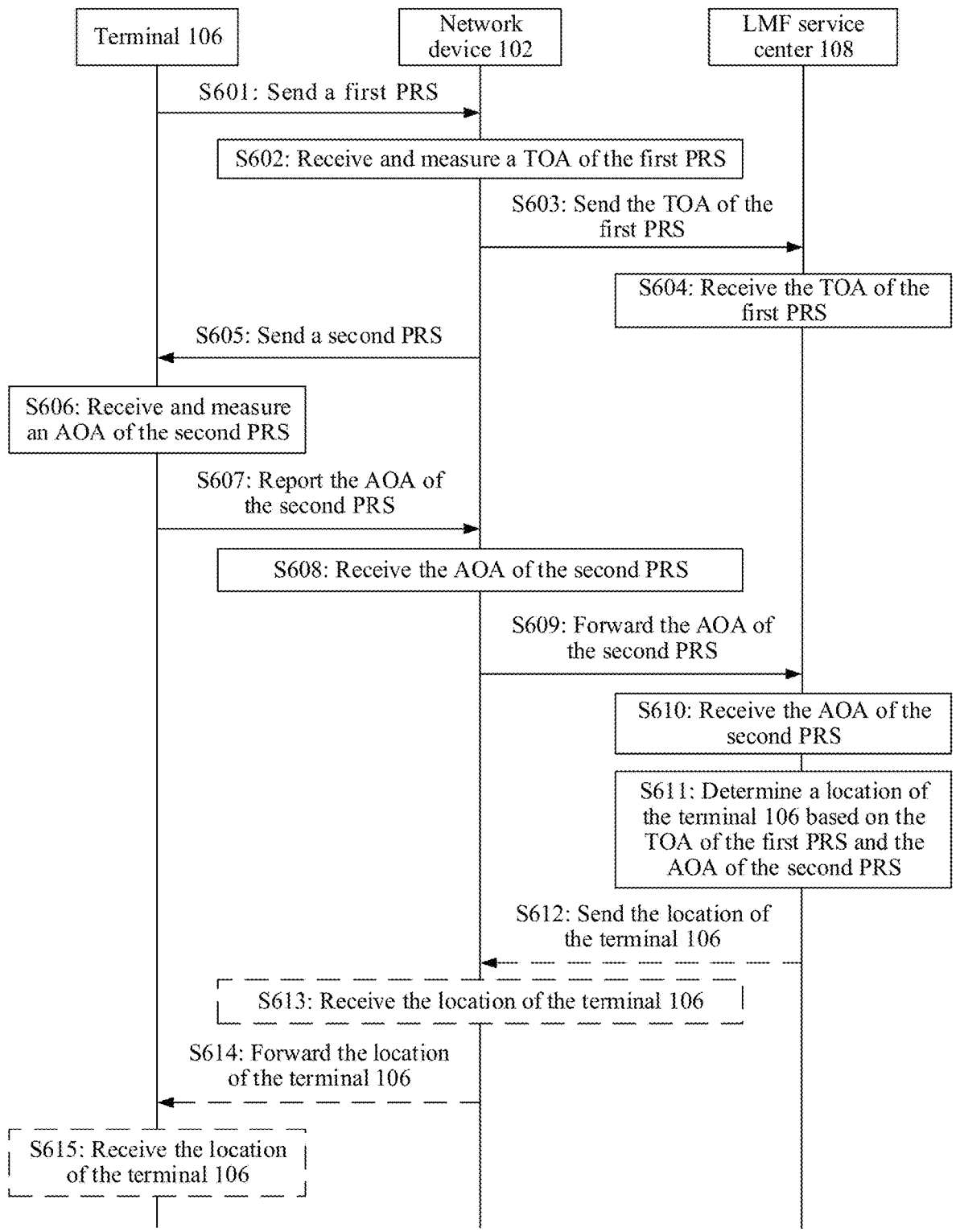
FIG. 6D is a schematic flowchart 5 of a positioning method according to an embodiment of this application.

For example, as shown in FIG. 6D, based on the sub-scenario 2 in the scenario 12, the method shown in FIG. 2 may be further specifically implemented as S601 to S611:

S601: The terminal 106 sends the first PRS to the network device 102.

S602: The network device 102 receives and measures the TOA of the first PRS.

It should be noted that execution methods of S601 and S602 are similar to those of S401 and S402. Details are not described herein again.

Because S204 in the foregoing method embodiment is performed by the LMF service center 108 connected to the network device 102, the network device 102 further needs to send the TOA of the first PRS to the LMF service center 108. Therefore, after S601 and S602 are performed, S603 and S604 further need to be performed:

S603: The network device 102 sends the TOA of the first PRS to the LMF service center.

S604: The LMF service center receives the TOA that is of the first PRS and that is sent by the network device 102.

It should be noted that execution methods of S603 and S604 are similar to those of S505 and S506. Details are not described herein again.

S605: The network device 102 sends the second PRS to the terminal 106.

S606: The terminal 106 receives and measures the AOA of the second PRS.

It should be noted that execution methods of S605 and S606 are similar to those of S303 and S304. Details are not described herein again.

Because S204 in the foregoing method embodiment is performed by the LMF service center 108 connected to the network device 102, the terminal 106 further needs to report the AOA of the second PRS to the network device 102, and the network device 102 forwards the AOA to the LMF service center 108. Therefore, after S605 and S606 are performed, S607 to S610 further need to be performed:

S607: The terminal 106 reports the AOA of the second PRS to the network device 102.

S608: The network device 102 receives the AOA that is of the second PRS and that is reported by the terminal 106.

For example, the terminal 106 may report the AOA of the second PRS in the form of uplink signaling such as the measurement report or the location update report. Details are not described in this embodiment of this application.

S609: The network device 102 forwards the AOA of the second PRS to the LMF service center.

S610: The LMF service center receives the AOA that is of the second PRS and that is forwarded by the network device 102.

It should be noted that execution methods of S609 and S610 are sequentially similar to those of S509 and S510. Details are not described herein again.

In addition, a sequence of performing S601 to S604 and S605 to S610 does not need to be limited in this embodiment of this application, provided that S601 to S604 and S605 to S610 are all performed before S611 is performed. Optionally, S601 to S604 may be performed before S605 to S610 are performed, or may be performed after S605 to S610 are performed. Optionally, S601 to S604 may be performed in a process of performing S605 to S610, and S605 to S610 may also be performed in a process of performing S601 to S604. Optionally, some of the steps in S601 to S604 may also be simultaneously performed with the steps in S605 to S610. For example, S603 and S604 and S609 and S610 may be combined for execution, to be specific, the network device 102 simultaneously sends the TOA of the first PRS and the AOA of the second PRS to the LMF service center 108.

S611: The LMF service center 108 determines the location of the terminal 106 based on the TOA of the first PRS and the AOA of the second PRS.

Because S611 is similar to S511, details are not described herein again.

Then, if the terminal 106 needs to learn of location information of the terminal 106, for example, the terminal 106 is running an application such as a map, navigation, or self-driving, the method may further include S612 to S615 (represented by dashed lines in FIG. 6D):

S612: The LMF service center 108 sends the location of the terminal 106 to the network device 102.

S613: The network device 102 receives the location that is of the terminal 106 and that is sent by the LMF service center 108.

S614: The network device 102 forwards the location of the terminal 106 to the terminal 106.

S615: The terminal 106 receives the location that is of the terminal 106 and that is forwarded by the network device 102.

Because S612 to S615 are similar to S512 to S515, details are not described herein again. It should be noted that FIG. 6A to FIG. 6D show only an execution procedure of a positioning method in a total of four scenarios: the scenario 2 shown in Table 1, the sub-scenarios 2 in the scenario 6 and the scenario 7 shown in Table 2, and the sub-scenario 2 in the scenario 12 shown in Table 3. It may be understood that, for other scenarios and/or sub-scenarios other than the foregoing four sub-scenarios shown in Table 1 to Table 3, refer to FIG. 6A to FIG. 6D and corresponding text descriptions, and adaptive adjustment may be made. Details are not described again in this embodiment of this application.

According to the positioning method provided in the embodiments of this application, the first PRS that is of a relatively large spectrum bandwidth and that is required for high-accuracy positioning can be received and measured by using the unlicensed spectrum, the second PRS can be received and measured by using an allocated frequency domain resource in the licensed spectrum, and the location of the terminal is determined based on the first positioning measurement result corresponding to the first PRS and the second positioning measurement result corresponding to the second PRS, so as to avoid occupying a large quantity of frequency domain resources in the licensed spectrum in a process of performing high-accuracy positioning on the terminal. In this way, the location of the terminal can be quickly and accurately determined without occupying a large quantity of frequency domain resources in the licensed spectrum, and more frequency domain resources in the licensed spectrum can be reserved for service data transmission, thereby improving resource utilization of the licensed spectrum, and improving a system capacity and working efficiency of a communications system.

The positioning method provided in the embodiments of this application is described above in detail with reference to FIG. 1 to FIG. 6D. The positioning apparatus or device provided in the embodiments of this application is described below in detail with reference to FIG. 7 to FIG. 10. The positioning apparatus or device may be a network device, a terminal, an LMF service center, or another apparatus or device that can perform the positioning method.

Figure 7:
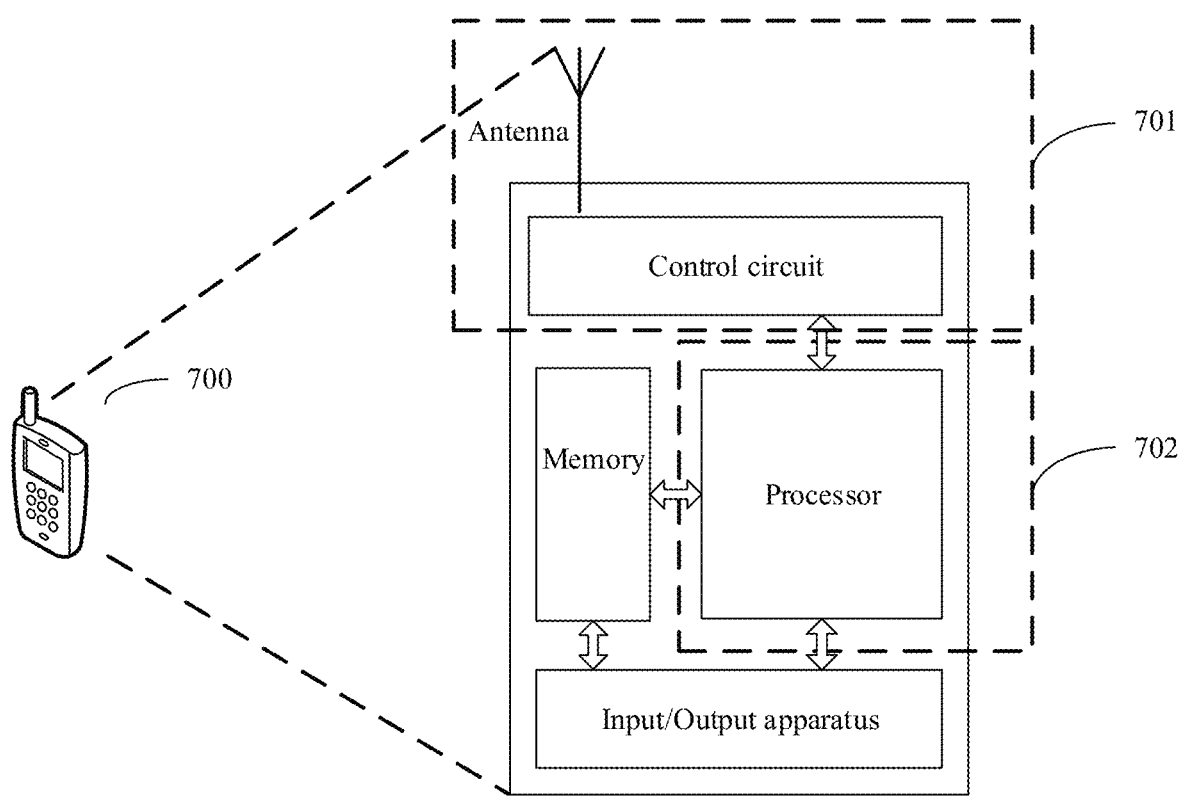
FIG. 7 is a schematic structural diagram of a terminal according to an embodiment of this application.

FIG. 7 is a schematic structural diagram of a terminal according to an embodiment of this application. The terminal is applicable to the communications system shown in FIG. 1 or FIG. 5, and executes a function of the terminal in the foregoing method embodiments. For ease of description, FIG. 7 shows only main components of the terminal. As shown in FIG. 7, a terminal 700 includes a processor, a memory, a control circuit, an antenna, and an input/output apparatus. The processor is mainly configured to: process a communications protocol and communications data, control the entire terminal, execute a software program, and process data of the software program, for example, is configured to support the terminal in performing the action performed by the terminal 106 in the foregoing method embodiment, for example, receiving or sending a first PRS, receiving or sending a second PRS, and performing various actions described in S204 in the foregoing method embodiment. The memory is mainly configured to store a software program and data, for example, store the program code, the first PRS, the second PRS, the first positioning measurement result, the second positioning measurement result, and the like described in the foregoing embodiments. The control circuit is mainly configured to: convert a baseband signal and a radio frequency signal, and process the radio frequency signal. The control circuit together with the antenna may also be referred to as a transceiver, and is mainly configured to receive and send a radio frequency signal in an electromagnetic wave form. The input/output apparatus, such as a touchscreen, a display screen, or a keyboard, is mainly configured to receive data input by a user and output data to the user, for example, receive a positioning instruction input by the user to the terminal, and output location information of the terminal, such as longitude and latitude.

After the terminal is powered on, the processor may read the software program in the storage unit, interpret and execute an instruction of the software program, and process data of the software program. When data needs to be sent in a wireless manner, the processor performs baseband processing on to-be-sent data, and then outputs a baseband signal to a radio frequency circuit. After performing radio frequency processing on the baseband signal, the radio frequency circuit sends a radio frequency signal to the outside by using the antenna in an electromagnetic wave form. When data is sent to the terminal, the radio frequency circuit receives the radio frequency signal through the antenna, converts the radio frequency signal into the baseband signal, and outputs the baseband signal to the processor. The processor converts the baseband signal into data, and processes the data.

A person skilled in the art may understand that for ease of description, FIG. 7 shows only one memory and one processor. An actual terminal may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data, and the central processing unit is mainly configured to: control the entire terminal, execute the software program, and process data of the software program. Functions of the baseband processor and the central processing unit may be integrated into the processor in FIG. 7. A person skilled in the art may understand that the baseband processor and the central processing unit each may be an independent processor, and are interconnected by using technologies such as a bus. A person skilled in the art may understand that the terminal may include a plurality of baseband processors to adapt to different network standards, the terminal may include a plurality of central processing units to enhance a processing capability of the terminal, and all components of the terminal may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a software program form. The processor executes the software program to implement a baseband processing function.

In this embodiment of this application, the antenna and the control circuit that have receiving and sending functions may be considered as a transceiver unit 701 of the terminal 700, for example, configured to support the terminal in performing at least one of the receiving function and the sending function in FIG. 2 and FIG. 6D. The processor having a processing function is considered as a processing unit 702 of the terminal 700. As shown in FIG. 7, the terminal 700 includes a transceiver unit 701 and a processing unit 702. The transceiver unit may also be referred to as a transceiver, a transceiver, a transceiver apparatus, or the like. Optionally, a device configured to implement the receiving function in the transceiver unit 701 may be considered as a receiving unit, and a device configured to implement the sending function in the transceiver unit 701 may be considered as a sending unit. In other words, the transceiver unit 701 includes the receiving unit and the sending unit. The receiving unit may also be referred to as a receiver, an input port, a receiver circuit, or the like. The sending unit may be referred to as a transmitter, a transmitter, a transmitter circuit, or the like.

The processor 702 may be configured to execute an instruction stored in the memory, to control the transceiver unit 701 to receive a signal and/or send a signal, to complete the function of the terminal device in the foregoing method embodiment. In an implementation, it may be considered that the functions of the transceiver unit 701 are implemented by using a transceiver circuit or a transceiver-dedicated chip.

Figure 8:
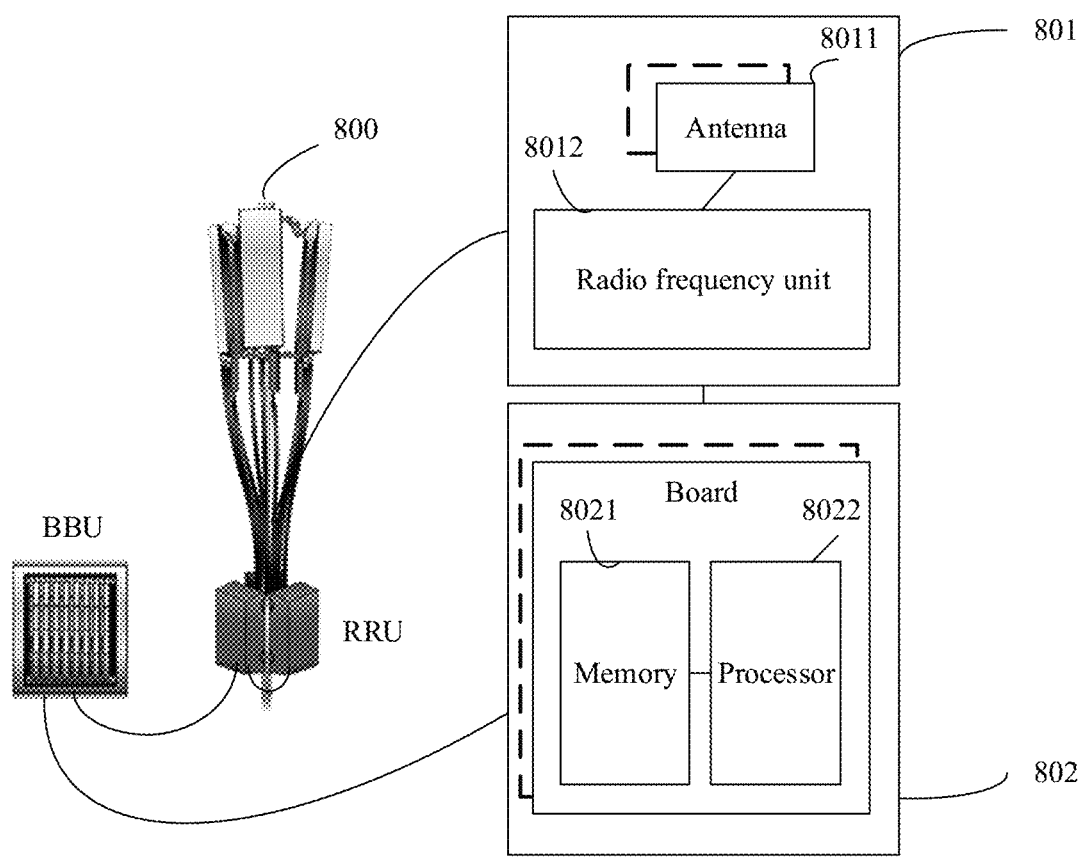
FIG. 8 is a schematic structural diagram of a network device according to an embodiment of this application.

FIG. 8 is a schematic structural diagram of a network device according to an embodiment of this application, for example, may be a schematic structural diagram of a base station. As shown in FIG. 8, a base station 800 may be applied to the communications system shown in FIG. 1 or FIG. 5, and perform functions of the network device 102 or the network device 104 in the foregoing method embodiments. The base station 800 may include one or more radio frequency units, such as a remote radio unit (RRU) 801 and one or more baseband units (BBU) 802. The RRU 801 may be referred to as a transceiver unit, a transceiver, a transceiver circuit, a transceiver, or the like, and may include at least one antenna 8011 and a radio frequency unit 8012. The RRU 801 part is mainly configured to perform sending and receiving of a radio frequency signal and conversion between a radio frequency signal and a baseband signal, for example, configured to send the signaling message in the foregoing embodiments to a terminal. The BBU 802 part is mainly configured to perform baseband processing, control the base station, and the like. The RRU 801 and the BBU 802 may be physically disposed together, or may be physically separated, that is, in a distributed base station.

The BBU 802 is a control center of the base station, may also be referred to as a processing unit, and is mainly configured to complete baseband processing functions such as channel coding, multiplexing, modulation, and spectrum spreading. For example, The BBU (the processing unit) 802 may be configured to control the base station to execute an operation procedure related to the network device in the foregoing method embodiments.

In an example, the BBU 802 may include one or more boards. A plurality of boards may jointly support a radio access network (such as an LTE network) of a single access standard, or may separately support radio access networks (such as an LTE network, a 5G network, or another network) of different access standards. The BBU 802 further includes a memory 8021 and a processor 8022. The memory 8021 is configured to store a necessary instruction and necessary data. For example, the memory 8021 is configured to store the received first PRS and second PRS, and at least one of the first positioning measurement result and the second positioning measurement result in the foregoing embodiments. The processor 8022 is configured to control the base station to perform a necessary action, for example, is configured to control the base station to perform an operation procedure related to the network device in the foregoing method embodiments. The memory 8021 and the processor 8022 may serve the one or more boards. In other words, the memory and processor can be separately set on each board. Alternatively, a plurality of boards may share a same memory and a same processor. In addition, a necessary circuit may be further disposed on each board.

Figure 9:
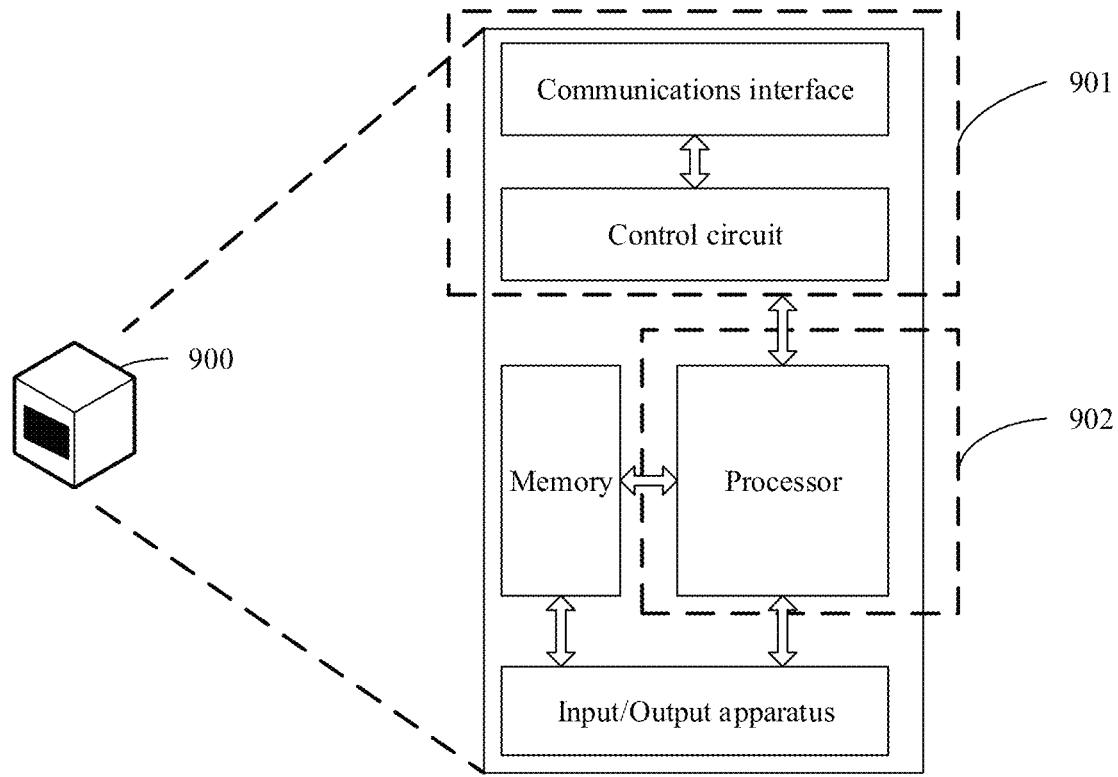
FIG. 9 is a schematic structural diagram of an LMF service center according to an embodiment of this application.

FIG. 9 is a schematic structural diagram of an LMF service center according to an embodiment of this application. The LMF service center is applicable to the communications system shown in FIG. 1 or FIG. 5, and executes a function of the LMF service center in the foregoing method embodiments. For ease of description, FIG. 9 shows only main components of the LMF service center. As shown in FIG. 9, an LMF service center 900 includes a processor, a memory, a control circuit, and an input/output apparatus. The processor is mainly configured to process a first positioning measurement result and a second positioning measurement result, control the entire LMF service center, execute a software program, and process data of the software program, for example, configured to support the LMF service center in performing an action performed by the LMF service center 108 in the method embodiment shown in FIG. 5, FIG. 6C, or FIG. 6D, for example, receiving the first positioning measurement result and the second positioning measurement result, and performing various actions described in S204 in the foregoing method embodiment. The memory is mainly configured to store the software program and data, for example, store the program code, the first positioning measurement result, the second positioning measurement result, and the like described in the foregoing embodiments. The control circuit is mainly configured to: receive the first positioning measurement result and the second positioning measurement result, and send determined location information of the terminal to the network device or the terminal. The control circuit, together with a communications interface between the LMF service center and the network device and/or the terminal, may also be referred to as a transceiver, which is mainly configured to receive and send a wired signal or a wireless signal. The input/output apparatus, for example, a display screen or a keyboard, is mainly configured to receive a positioning instruction input by a user and location information that is of the terminal and that is output to the user.

After the LMF service center is powered on, the processor may read the software program in the storage unit, interpret and execute an instruction of the software program, and process data of the software program. When the first positioning measurement result and the second positioning measurement result are sent to the LMF service center, the control circuit controls the communications interface to receive the first positioning measurement result and the second positioning measurement result, and sends the received first positioning measurement result and second positioning measurement result to the processor, the processor determines a location of the terminal based on the received first positioning measurement result and second positioning measurement result. When the location of the terminal needs to be sent, the processor outputs the location of the terminal to the communications interface, and the control circuit controls the communications interface to send the location.

A person skilled in the art may understand that for ease of description, FIG. 9 shows only one memory and one processor. An actual LMF service center may have a plurality of processors and a plurality of memories. The memory may also be referred to as a storage medium, a storage device, or the like. This is not limited in this embodiment of this application.

In an optional implementation, the processor may include a central processor, and the central processor is mainly configured to: control an entire LMF service center, execute the software program, and process the data of the software program. A person skilled in the art may understand that the central processing unit may alternatively be a plurality of processors that are independent of each other and that are interconnected by using a technology such as a bus. A person skilled in the art may understand that the LMF service center may include a plurality of central processing units to enhance a processing capability of the LMF service center, and components of the LMF service center may be connected by using various buses. The central processing unit may also be expressed as a central processing circuit or a central processing chip.

In this embodiment of this application, the communications interface and the control circuit that have receiving and sending functions may be considered as a transceiver unit 901 of the LMF service center 900, for example, configured to support the LMF service center in performing the receiving function and the sending function that are performed by the LMF service center in FIG. 5, FIG. 6C, or FIG. 6D. The processor having a processing function is considered as a processing unit 902 of the LMF service center 900. As shown in FIG. 9, the LMF service center 900 includes a transceiver unit 901 and a processing unit 902. The transceiver unit may also be referred to as a transceiver, a transceiver, a transceiver apparatus, or the like. Optionally, a device configured to implement the receiving function in the transceiver unit 901 may be considered as a receiving unit, and a device configured to implement the sending function in the transceiver unit 901 may be considered as a sending unit. In other words, the transceiver unit 901 includes the receiving unit and the sending unit. The receiving unit may also be referred to as a receiver, an input port, a receiver circuit, or the like. The sending unit may be referred to as a transmitter, a transmitter, a transmitter circuit, or the like.

The processor 902 may be configured to execute an instruction stored in the memory, to control the transceiver unit 901 to receive a signal and/or send a signal, to complete the function of the LMF service center device in the foregoing method embodiment. In an implementation, it may be considered that the functions of the transceiver unit 901 are implemented by using a transceiver circuit or a transceiver-dedicated chip.

Figure 10:
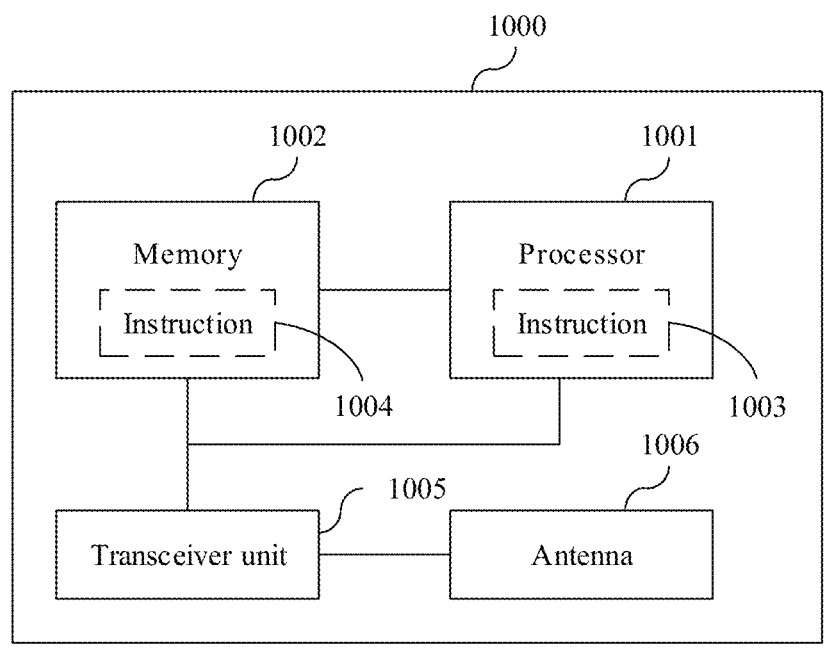
FIG. 10 is a schematic structural diagram of a positioning apparatus according to an embodiment of this application.

FIG. 10 is a schematic structural diagram of a positioning apparatus 1000. As shown in FIG. 10, the apparatus 1000 may be configured to implement the method described in the foregoing method embodiments. For details, refer to the description in the foregoing method embodiments. The positioning apparatus 1000 may be a chip, the foregoing network device (such as the base station), terminal, LMF service center, or another network device that can perform the positioning method provided in the embodiments of this application.

The positioning apparatus 1000 includes one or more processors 1001. The processor 1001 may be a general purpose processor, a dedicated processor, or the like. For example, the processor 1001 may be a baseband processor or a central processing unit. The baseband processor may be configured to process a communication protocol and communication data. The central processing unit may be configured to: control the positioning apparatus (such as a base station, a terminal, or a chip), execute a software program, and process data of the software program. The positioning apparatus may include a transceiver unit, configured to input (receive) and output (send) a signal. For example, the positioning apparatus may be a chip, and the transceiver unit may be an input and/or output circuit or a communications interface of the chip. The chip may be applied to a terminal, a base station, an LMF service center, or another network device. For another example, the positioning apparatus may be a terminal, a base station, an LMF service center, or another network device, and the transceiver unit may be a transceiver, a radio frequency chip, or the like.

The positioning apparatus 1000 includes one or more processors 1001, and the one or more processors 1001 may implement a PRS receiving and sending function and a positioning method that are executed by the network device, the terminal, or the LMF service center in the embodiments shown in at least one of FIG. 2 and FIG. 5.

In a possible design, the positioning apparatus 1000 includes components configured to perform processing functions performed by the terminal, the network device, and the LMF service center in the foregoing method embodiments. For example, the foregoing function may be performed by using one or more processors, to send or receive a first PRS, send or receive a second PRS, send or receive a first positioning measurement result, send or receive a second positioning measurement result, or the like by using a transceiver, or an input/output circuit, or an interface of a chip. For the first PRS, the second PRS, the first positioning measurement result, and the second positioning measurement result, refer to related descriptions in the foregoing method embodiments.

Optionally, in addition to the method in the embodiments shown in FIG. 2 and FIG. 5, the processor 1001 may further implement another function.

Optionally, in a design, the processor 1001 may further include an instruction 1003. The instruction may be run on the processor, so that the positioning apparatus 1000 is enabled to perform the method described in the foregoing method embodiments.

In still another possible design, the positioning apparatus 1000 may alternatively include a circuit. The circuit may implement functions of the network device, the terminal, or the LMF service center in the foregoing method embodiments.

In still another possible design, the positioning apparatus 1000 may include one or more memories 1002. The memory stores an instruction 1004, and the instruction may be run on the processor, so that the positioning apparatus 1000 is enabled to perform the method described in the foregoing embodiments. Optionally, the memory may further store data. Optionally, the processor may also store an instruction and/or data. For example, the one or more memories 1002 may store configuration information described in the foregoing embodiments. The processor and the memory may be disposed separately, or may be integrated together.

In still another possible design, the positioning apparatus 1000 may further include a transceiver unit 1005 and an antenna 1006. The processor 1001 may be referred to as a processing unit, and controls an action of the positioning apparatus (the terminal, the network device, or the LMF service center). The transceiver unit 1005 may be referred to as a transceiver, a transceiver circuit, a transceiver, or the like, and is configured to implement a transceiver function of the positioning apparatus by using the antenna 1006 or another interface.

This application further provides a positioning system, including the foregoing one or more network devices, one or more terminals, and one or more LMF service centers.

It should also be understood that, in the embodiments of this application, the processor may be a central processing unit (CPU). The processor may alternatively be another general purpose processor, a digital signal processor (DSP), an application-specific integrated circuit (ASIC), a field programmable gate array (FPGA) or another programmable logical device, discrete gate or transistor logical device, discrete hardware component, or the like. The general purpose processor may be a microprocessor, or the processor may be any conventional processor or the like.

It should be further understood that, in the embodiments of this application, the memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of random access memories (RAM) may be used, for example, a static random access memory (static RAM, SRAM), a dynamic random access memory (dynamic RAM, DRAM), a synchronous dynamic random access memory (synchronous DRAM, SDRAM), a double data rate-synchronous dynamic random access memory (double Data Rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware (such as a circuit), firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a network cable, an optical fiber, or a cable) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent three cases: Only A exists, both A and B exist, and only B exists. A and B may be singular or plural. In addition, the character "/" in this specification usually represents an "or" relationship between associated objects, or may alternatively represent an "and/or" relationship. For details, refer to foregoing and following descriptions for understanding.

In this application, "at least one" means one or more, and "a plurality of" means two or more. "At least one item (piece) of the following" or a similar expression thereof means any combination of the items, including any combination of singular items (pieces) or plural items (pieces). For example, at least one (one piece) of a, b, or c may indicate: a, b, c, a-b, a-c, b-c, or a-b-c, where a, b, and c may be singular or plural.

In this application, the terms "first", "second", and the like are intended to distinguish between different objects or distinguish between different processing of a same object, but do not indicate a particular order of the objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall in the protection scope of this application. Therefore, the protection scope of this application shall be subject to the protection scope of the claims.

The invention claimed is:

1. A positioning method, comprising:
receiving a first positioning reference signal (PRS) on a first frequency domain resource, wherein the first frequency domain resource is a frequency domain resource in an unlicensed spectrum, and wherein the first positioning measurement result comprises a time of arrival (TOA) of the first PRS or a time difference of arrival (TDOA) of the first PRS, wherein the TDOA is a difference value between TOAs that the first PRS sent by a terminal takes to arrive at different network devices, or a difference value between TOAs that first PRSs sent by different network devices take to arrive at the terminal;
receiving a second PRS on a second frequency domain resource, wherein the second frequency domain resource is a frequency domain resource in a licensed spectrum, and wherein the second positioning measurement result comprises an angle of arrival (AOA) of the second PRS;
determining, based on the first PRS and the second PRS, a first positioning measurement result corresponding to the first PRS and a second positioning measurement result corresponding to the second PRS; and
determining a location of the terminal based on the first positioning measurement result and the second positioning measurement result, wherein the location of the terminal is determined based on the AOA of the second PRS in the licensed spectrum and the TOA or the TDOA of the first PRS in the unlicensed spectrum.

2. The positioning method according to claim 1, wherein the first frequency domain resource is the frequency domain resource of a first preset bandwidth in the unlicensed spectrum; and the second frequency domain resource is the frequency domain resource of a second preset bandwidth in the licensed spectrum.

3. The positioning method according to claim 2, wherein the first preset bandwidth is an overall bandwidth of the unlicensed spectrum, the second preset bandwidth is a part of a bandwidth of the licensed spectrum, and the first preset bandwidth is greater than the second preset bandwidth.

4. The positioning method according to claim 1, wherein the first frequency domain resource is the frequency domain resource that is in the unlicensed spectrum and that corresponds to a preset time window; the preset time window comprises a first preset quantity of time units, the time unit is one of the following: a symbol or a slot, and the first preset quantity is greater than or equal to 1.

5. The positioning method according to claim 4, wherein the time units of the first preset quantity that is greater than 1 are all consecutive.

6. The positioning method according to claim 4, wherein the second frequency domain resource is the frequency domain resource that is in the licensed spectrum and that corresponds to the preset time window.

7. The positioning method according to claim 4, wherein the preset time window is in a preset periodicity, the preset periodicity comprises a second preset quantity of consecutive time units, and the second preset quantity is greater than the first preset quantity.

8. A positioning apparatus, comprising:
a receiver configured to:
receive a first positioning reference signal (PRS) on a first frequency domain resource, wherein the first frequency domain resource is a frequency domain resource in an unlicensed spectrum, and wherein the first positioning measurement result comprises a time of arrival (TOA) of the first PRS or a time difference of arrival (TDOA) of the first PRS, wherein the TDOA is a difference value between TOAs that the first PRS sent by a terminal takes to arrive at different network devices, or a difference value between TOAs that first PRSs sent by different network devices take to arrive at the terminal; and
receive a second PRS on a second frequency domain resource, wherein the second frequency domain resource is a frequency domain resource in a licensed spectrum, and wherein the second positioning measurement result comprises an angle of arrival (AOA) of the second PRS;
a non-transitory memory storage comprising instructions; and
one or more hardware processors in communication with the non-transitory memory storage, wherein the one or more hardware processors execute the instructions to:
determine, based on the first PRS and the second PRS, a first positioning measurement result corresponding to the first PRS and a second positioning measurement result corresponding to the second PRS; and
determine a location of the terminal based on the first positioning measurement result and the second positioning measurement result, wherein the location of the terminal is determined based on the AOA of the second PRS in the licensed spectrum and the TOA or the TDOA of the first PRS in the unlicensed spectrum.

9. The positioning apparatus according to claim 8, wherein the first frequency domain resource is the frequency domain resource of a first preset bandwidth in the unlicensed spectrum; and the second frequency domain resource is the frequency domain resource of a second preset bandwidth in the licensed spectrum.

10. The positioning apparatus according to claim 9, wherein the first preset bandwidth is an overall bandwidth of the unlicensed spectrum, and the second preset bandwidth is a part of a bandwidth of the licensed spectrum.

11. The positioning apparatus according to claim 8, wherein the first frequency domain resource is the frequency domain resource that is in the unlicensed spectrum and that corresponds to a preset time window; the preset time window comprises a first preset quantity of time units, the time unit is one of the following: a symbol or a slot, and the first preset quantity is greater than or equal to 1.

12. The positioning apparatus according to claim 11, wherein the time units of the first preset quantity that is greater than 1 are all consecutive.

13. The positioning apparatus according to claim 11, wherein the second frequency domain resource is the frequency domain resource that is in the licensed spectrum and that corresponds to the preset time window.

14. The positioning apparatus according to claim 11, wherein the preset time window is in a preset periodicity, the preset periodicity comprises a second preset quantity of consecutive time units, and the second preset quantity is greater than the first preset quantity.

15. A positioning device, comprising a processor and a receiver, wherein
the receiver is configured to receive a first positioning reference signal (PRS) on a first frequency domain resource, wherein the first frequency domain resource is a frequency domain resource in an unlicensed spectrum, and wherein the first positioning measurement result comprises a time of arrival (TOA) of the first PRS or a time difference of arrival (TDOA) of the first PRS, wherein the TDOA is a difference value between TOAs that the first PRS sent by a terminal takes to arrive at different network devices, or a difference value between TOAs that first PRSs sent by different network devices take to arrive at the terminal;
the receiver is configured to receive a second PRS on a second frequency domain resource, wherein the second frequency domain resource is a frequency domain resource in a licensed spectrum, and wherein the second positioning measurement result comprises an angle of arrival (AOA) of the second PRS;
the processor is configured to determine, based on the first PRS and the second PRS, a first positioning measurement result corresponding to the first PRS and a second positioning measurement result corresponding to the second PRS; and
the processor is configured to determine a location of a terminal based on the first positioning measurement result and the second positioning measurement result, wherein the location of the terminal is determined based on the AOA of the second PRS in the licensed spectrum and the TOA or the TDOA of the first PRS in the unlicensed spectrum.

16. The positioning device according to claim 15, wherein the first frequency domain resource is the frequency domain resource of a first preset bandwidth in the unlicensed spectrum; and the second frequency domain resource is the frequency domain resource of a second preset bandwidth in the licensed spectrum.

17. The positioning device according to claim 16, wherein the first preset bandwidth is an overall bandwidth of the unlicensed spectrum, the second preset bandwidth is a part of a bandwidth of the licensed spectrum, and the first preset bandwidth is greater than the second preset bandwidth.

18. The positioning device according to claim 15, wherein the first frequency domain resource is the frequency domain resource that is in the unlicensed spectrum and that corresponds to a preset time window; the preset time window comprises a first preset quantity of time units, the time unit is one of the following: a symbol or a slot, and the first preset quantity is greater than or equal to 1.

19. The positioning device according to claim 18, wherein the time units of the first preset quantity that is greater than 1 are all consecutive.

20. The positioning device according to claim 18, wherein the second frequency domain resource is the frequency domain resource that is in the licensed spectrum and that corresponds to the preset time window.

* * * * *